US012450494B1

(12) United States Patent
Mysore et al.

(10) Patent No.: US 12,450,494 B1
(45) Date of Patent: Oct. 21, 2025

(54) VALIDATING AUTONOMOUS ARTIFICIAL INTELLIGENCE (AI) AGENTS USING GENERATIVE AI

(71) Applicant: Citibank, N.A., New York, NY (US)

(72) Inventors: Vishal Mysore, Mississauga (CA); Ramkumar Ayyadurai, Jersey City, NJ (US); Chamindra DeSilva, London (GB); Shardul Malviya, London (GB); Wayne Liao, London (GB); Deepak Jain, London (GB); Samantha Cory, London (GB); Mariusz Saternus, Cracow (PL); Daniel Lewandowski, Cracow (PL); Biraj Krushna Rath, London (GB); Stuart Murray, London (GB); Philip Davies, London (GB); Payal Jain, London (GB); Tariq Husayn Maonah, London (GB)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 18/983,342

(22) Filed: Dec. 17, 2024

Related U.S. Application Data

(63) Continuation-in-part of application No. 18/782,019, filed on Jul. 23, 2024, now Pat. No. 12,197,859.
(Continued)

(51) Int. Cl.
*G06N 3/08* (2023.01)
*G06N 3/0895* (2023.01)
(52) U.S. Cl.
CPC .................. *G06N 3/0895* (2023.01)

(58) Field of Classification Search
None
See application file for complete search history.

(56) References Cited

U.S. PATENT DOCUMENTS 9,842,045 B2 12/2017 Heorhiadi et al.
10,324,827 B2 6/2019 Narayanan et al.
(Continued)

FOREIGN PATENT DOCUMENTS

CN 106502890 A 3/2017
WO 2022125803 A1 6/2022
WO 2024020416 A1 1/2024

OTHER PUBLICATIONS

Yuan et al., R-Judge: Benchmarking Safety Risk Awareness for LLM Agents, arXiv:2401.10019v1 [cs.CL] Jan. 18, 2024; Total pp. 23 (Year: 2024).*

(Continued)

*Primary Examiner* — Alan Chen
(74) *Attorney, Agent, or Firm* — Perkins Coie LLP

(57) ABSTRACT

The systems and methods disclosed herein obtain a set of alphanumeric characters defining constraints for agents and the agents' operational data. Each agent uses an output from a first set of artificial intelligence (AI) models and pre-defined objectives to autonomously generate proposed actions for execution on software application(s). For each agent, a second set of AI models evaluates the agent by identifying gaps in the proposed actions by comparing them with the expected actions. Using a third set of AI models and the identified gaps, the systems modify the proposed actions by adding, altering, or removing actions from the proposed actions.

20 Claims, 16 Drawing Sheets

Related U.S. Application Data which is a continuation-in-part of application No. 18/771,876, filed on Jul. 12, 2024, now Pat. No. 12,204,323, said application No. 18/661,532 is a continuation-in-part of application No. 18/661,519, filed on May 10, 2024, now Pat. No. 12,106,205, said application No. 18/771,876 is a continuation-in-part of application No. 18/661,532, filed on May 10, 2024, now Pat. No. 12,111,747, application No. 18/983,342 is a continuation-in-part of application No. 18/653,858, filed on May 2, 2024, now Pat. No. 12,198,030, which is a continuation-in-part of application No. 18/637,362, filed on Apr. 16, 2024, now Pat. No. 12,111,754, said application No. 18/661,532 is a continuation-in-part of application No. 18/633,293, filed on Apr. 11, 2024, now Pat. No. 12,147,513.

(56) References Cited

U.S. PATENT DOCUMENTS

| | | |
|---|---|---|
| 10,949,337 B1 | 3/2021 | Yalla et al. |
| 11,106,801 B1 | 8/2021 | Levine et al. |
| 11,227,047 B1 | 1/2022 | Vashisht et al. |
| 11,449,798 B2 | 9/2022 | Olgiati et al. |
| 11,573,848 B2 | 2/2023 | Linck et al. |
| 11,636,027 B2 | 4/2023 | Sloane |
| 11,656,852 B2 | 5/2023 | Mazurskiy |
| 11,750,717 B2 | 9/2023 | Walsh et al. |
| 11,875,123 B1 | 1/2024 | Ben David et al. |
| 11,875,130 B1 | 1/2024 | Bosnjakovic et al. |
| 11,924,027 B1 | 3/2024 | Mysore et al. |
| 11,947,435 B2 | 4/2024 | Boulineau et al. |
| 11,960,386 B2 | 4/2024 | Indani et al. |
| 11,960,515 B1 | 4/2024 | Pallakonda et al. |
| 11,983,806 B1 | 5/2024 | Ramesh et al. |
| 11,990,139 B1 | 5/2024 | Sandrew |
| 11,995,412 B1 | 5/2024 | Mishra |
| 12,001,463 B1 | 6/2024 | Pallakonda et al. |
| 12,026,599 B1 | 7/2024 | Lewis et al. |
| 2012/0161940 A1 | 6/2012 | Taylor |
| 2017/0262164 A1 | 9/2017 | Jain et al. |
| 2018/0089252 A1 | 3/2018 | Long et al. |
| 2018/0095866 A1 | 4/2018 | Narayanan et al. |
| 2019/0079854 A1 | 3/2019 | Lassance Oliveira E Silva et al. |
| 2021/0097433 A1 | 4/2021 | Olgiati et al. |
| 2022/0114399 A1 | 4/2022 | Castiglione et al. |
| 2022/0179906 A1 | 6/2022 | Desai et al. |
| 2022/0198304 A1 | 6/2022 | Szczepanik et al. |
| 2022/0311681 A1 | 9/2022 | Palladino et al. |
| 2022/0318654 A1 | 10/2022 | Lin et al. |
| 2022/0358023 A1 | 11/2022 | Moser et al. |
| 2022/0366140 A1 | 11/2022 | Saito et al. |
| 2023/0009999 A1 | 1/2023 | Higuchi et al. |
| 2023/0028339 A1 | 1/2023 | Sloane |
| 2023/0076795 A1 | 3/2023 | Indani et al. |
| 2023/0177441 A1 | 6/2023 | Durvasula et al. |
| 2023/0252393 A1 | 8/2023 | Orzechowski et al. |
| 2023/0269272 A1 | 8/2023 | Dambrot et al. |
| 2023/0359789 A1 | 11/2023 | Andre et al. |
| 2024/0020538 A1 | 1/2024 | Socher et al. |
| 2024/0095077 A1 | 3/2024 | Singh et al. |
| 2024/0129345 A1 | 4/2024 | Kassam et al. |
| 2024/0144082 A1 | 5/2024 | Tarapov et al. |
| 2024/0202442 A1 | 6/2024 | Saito et al. |
| 2024/0346283 A1 | 10/2024 | Ayachitula et al. |
| 2024/0370476 A1 | 11/2024 | Madisetti et al. |

OTHER PUBLICATIONS

Schick et al., Toolformer: Language Models Can Teach Themselves to Use Tools, 37th Conference on Neural Information Processing Systems (NeurIPS 2023); Total pp. 13 (Year: 2023).*

Lai et al., Towards a Science of Human-AI Decision Making: A Survey of Empirical Studies, arXiv:2112.11471v1 [cs.AI] Dec. 21, 2021; Total pp. 36 (Year: 2021).*

Empower Your Team with a Compliance Co-Pilot, Sedric, retrieved on Sep. 25, 2024. https://www.sedric.ai/.

Cranium, Adopt & Accelerate AI Safely, retrieved on Nov. 7, 2024, from https://cranium.ai/.

Generative machine learning models; IPCCOM000272835D, Aug. 17, 2023. (Year: 2023).

Guldimann, P., et al. "COMPL-AI Framework: A Technical Interpretation and LLM Benchmarking Suite for the EU Artificial Intelligence Act," arXiv:2410.07959v1 [cs.CL] Oct. 10, 2024, 38 pages.

Hu, Q., J., et al., "ROUTERBENCH: A Benchmark for Multi-LLM Routing System," arXiv:2403.12031v2 [cs.LG] Mar. 28, 2024, 16 pages.

International Search Report and Written Opinion received in Application No. PCT/US24/47571, dated Dec. 9, 2024, 10 pages.

Mathews, A. W., "What AI Can Do in Healthcare-and What It Should Never Do," The Wall Street Journal, published on Aug. 21, 2024, retrieved on Sep. 5, 2024 https://www.wsj.com.

Nauta, M., et al., "From Anecdotal Evidence to Quantative Evaluation Methods: A Systematic Review of Evaluating Explainable AI" ACM Computing Surveys, vol. 55 No. 13s Article 295, 2023 [retrieved Jul. 3, 2024].

Peers, M., "What California AI Bill Could Mean," The Briefing, published and retrieved Aug. 30, 2024, 8 pages, https://www.theinformation.com/articles/what-california-ai-bill-could-mean.

Zhou, Y., Liu, Y., Li, X., Jin, J., Qian, H., Liu, Z., Li, C., Dou, Z., Ho, T., & Yu, P. S. (2024). Trustworthiness in Retrieval-Augmented Generation Systems: A Survey. ArXiv./abs/2409.10102.

Aka et al., Measuring Model Biases in the Absence of Ground Truth, AIES '21, May 19-21, 2021, Virtual Event, USA.; pp. 327-335 (Year: 2021).

* cited by examiner

VALIDATING AUTONOMOUS ARTIFICIAL INTELLIGENCE (AI) AGENTS USING GENERATIVE AI

CROSS-REFERENCE TO RELATED APPLICATION(S)

This application is a continuation-in-part of U.S. patent application Ser. No. 18/653,858 entitled "VALIDATING VECTOR CONSTRAINTS OF OUTPUTS GENERATED BY MACHINE LEARNING MODELS" and filed May 2, 2024, which is a continuation-in-part of U.S. patent application Ser. No. 18/637,362 entitled "DYNAMICALLY VALIDATING AI APPLICATIONS FOR COMPLIANCE" and filed Apr. 16, 2024.

This application is further a continuation-in-part of U.S. patent application Ser. No. 18/782,019 entitled "IDENTIFYING AND ANALYZING ACTIONS FROM VECTOR REPRESENTATIONS OF ALPHANUMERIC CHARACTERS USING A LARGE LANGUAGE MODEL" and filed Jul. 23, 2024, which is a continuation-in-part of U.S. patent application Ser. No. 18/771,876 entitled "MAPPING IDENTIFIED GAPS IN CONTROLS TO OPERATIVE STANDARDS USING A GENERATIVE ARTIFICIAL INTELLIGENCE MODEL" and filed Jul. 12, 2024, which is a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024. The content of the foregoing applications is incorporated herein by reference in their entirety.

BACKGROUND

Artificial intelligence (AI) models often operate based on extensive and enormous training models. The models include a multiplicity of inputs and have the ability to determine how each input should be handled. When the model receives a new input, the model produces an output based on patterns determined from the data the model was trained on. A large language model (LLM) is a language model notable for its ability to perform general-purpose language generation and other natural language processing (NLP) tasks such as classification. LLMs can be used for text generation, a form of generative AI (e.g., GenAI, Gen AI, GAI), by taking an input text and repeatedly predicting the next token or word. LLMs acquire these abilities by learning statistical relationships from text documents during a computationally intensive self-supervised and semi-supervised training process. Generative AI models, such as LLMs, are increasing in use and applicability over time.

Agents are autonomous systems that perceive their environment and act upon their environment to achieve specific goals. An AI agent refers to a system or program that is capable of autonomously performing tasks on behalf of a user or another system by designing the agent's own workflow and using available tools. Agents operate based on predefined rules, learned behaviors, or a combination of both. However, though the autonomy enables agents to operate efficiently and respond quickly to changes in their environment, the autonomy also introduces challenges related to ensuring the correctness and reliability of the agent's actions.

Figure 1:
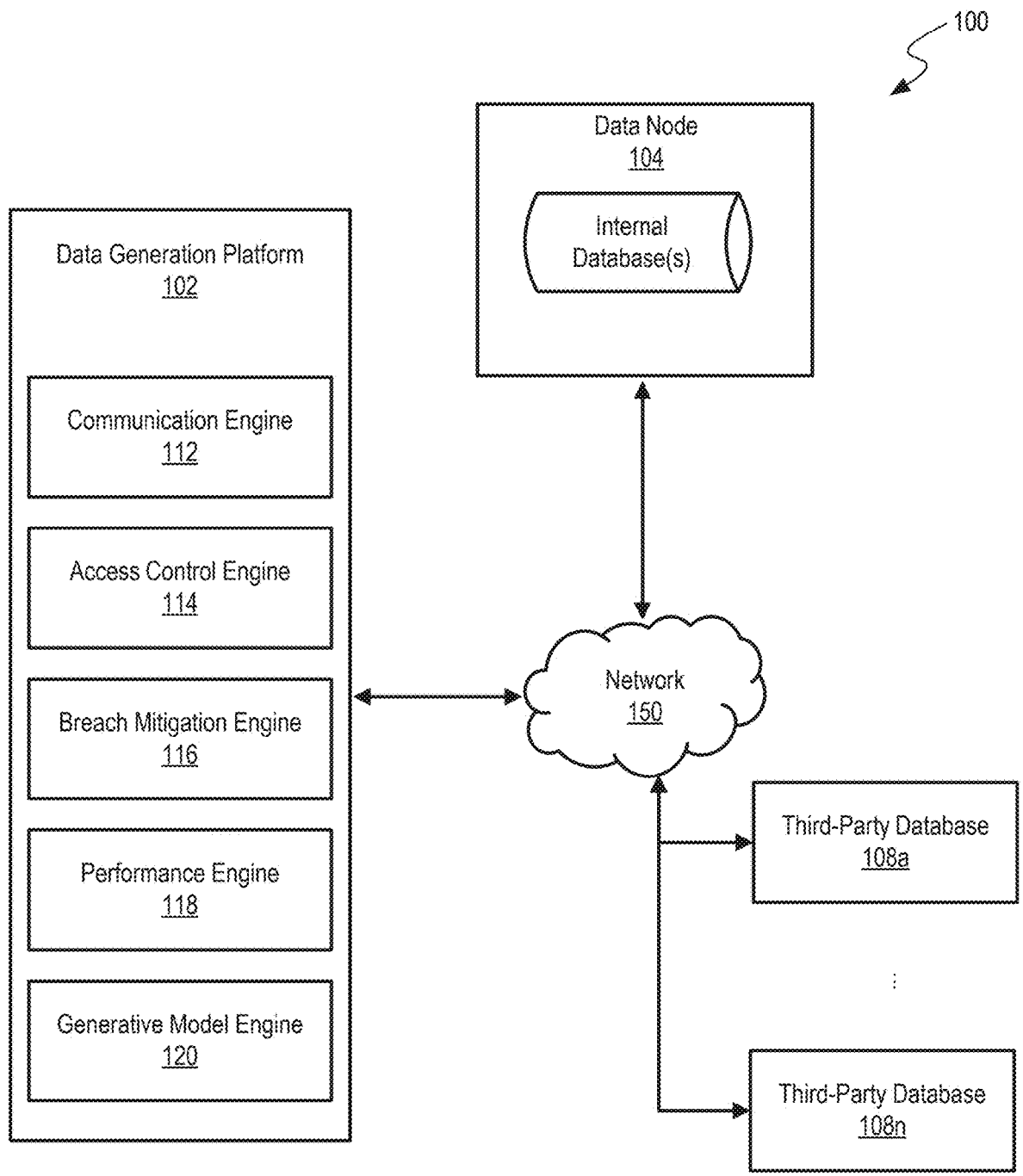
FIG. 1 shows an illustrative environment for evaluating language model prompts and outputs for model selection and validation.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Pre-existing LLMs and other generative machine learning models are promising for a variety of natural language processing (NLP) and generation applications. In addition to generating human-readable, verbal outputs, pre-existing systems can leverage LLMs to generate technical content, including software code, architectures, or code patches based on user prompts, such as in the case of a data analysis or software development pipeline. Based on particular model architectures and training data used to generate or tune LLMs, such models can exhibit different performance characteristics, specializations, performance behaviors, and attributes.

However, users or services of pre-existing software development systems (e.g., data pipelines for data processing and model or application development) do not have intuitive, consistent, or reliable ways to select particular LLM models and/or design associated prompts in order to solve a given problem (e.g., to generate a desired code associated with a particular software application). As such, pre-existing systems risk selection of sub-optimal (e.g., relatively inefficient and/or insecure) generative machine learning models. Furthermore, pre-existing software development systems do not control access to various system resources or models. Moreover, pre-existing development pipelines do not validate outputs of the LLMs for security breaches in a context-dependent and flexible manner. Code generated through an LLM can contain an error or a bug that can cause system instability (e.g., through loading the incorrect dependencies). Some generated outputs can be misleading or unreliable (e.g., due to model hallucinations or obsolete training data). Additionally or alternatively, some generated data (e.g., associated with natural language text) is not associated with the same severity of security risks. As such, pre-existing software development pipelines can require manual application of rules or policies for output validation depending on the precise nature of generated output, thereby leading to inefficiencies in data processing and application development.

The data generation platform disclosed herein enables dynamic evaluation of machine learning prompts for model selection, as well as validation of the resulting outputs, in order to improve the security, reliability, and modularity of data pipelines (e.g., software development systems). The data generation platform can receive a prompt from a user (e.g., a human-readable request relating to software development, such as code generation) and determine whether the user is authenticated based on an associated authentication token (e.g., as provided concurrently with the prompt). Based on the selected model, the data generation platform can determine a set of performance metrics (and/or corresponding values) associated with processing the requested prompt via the selected model. By doing so, the data generation platform can evaluate the suitability of the selected model (e.g., LLM) for generating an output based on the received input or prompt. The data generation platform can validate and/or modify the user's prompt according to a prompt validation model. Based on the results of the prompt validation model, the data generation platform can modify the prompt such that the prompt satisfies any associated validation criteria (e.g., through the redaction of sensitive data or other details), thereby mitigating the effect of potential security breaches, inaccuracies, or adversarial manipulation associated with the user's prompt.

The selected model(s) encounter further challenges as AI applications increasingly adopt AI agentic frameworks. AI agentic frameworks enable computing (e.g., software, software and hardware, and so forth) agents to operate autonomously, making decisions and performing actions based on their programming, learned behavior, or suggestions from AI models, or a combination of all three. While AI agentic frameworks offer substantial benefits in automating complex tasks, one major concern is the potential for agents to become rogue and make unauthorized or harmful decisions autonomously. AI agentic frameworks can present substantial risks if the agents act outside of intended parameters, violate compliance standards, exhibit biases in their actions, and so on. The potential high risk associated with particular applications, databases, and/or systems, the increasing number of regulatory standards, and the reactive approach create significant challenges in managing the agentic frameworks.

The potential high risk associated with particular applications, databases, and systems creates significant challenges in managing agentic frameworks because the components often handle sensitive data. High-risk applications, such as those used in financial services, healthcare, and government sectors, may be prime targets for malicious activities due to the valuable information they process. Databases storing personal, financial, or proprietary data are particularly vulnerable to breaches, which can result in severe consequences, including identity theft, financial fraud, and loss of intellectual property. Systems that support foundational infrastructure, such as power grids or transportation networks, face the risk of operational disruptions that can have widespread and catastrophic impacts.

Further, the increasing number of regulatory standards presents a significant challenge in managing agentic frameworks because organizations are required to navigate a complex and constantly evolving legal landscape. Regulatory bodies frequently update and introduce new standards to address emerging risks, technological advancements, and societal concerns. Compliance with the standards is oftentimes mandatory and often requires substantial changes to policies, procedures, and systems. Failure to comply can result in severe penalties, legal actions, and reputational damage. Additionally, organizations operating in multiple jurisdictions may be required to manage compliance with a diverse set of regulations, each with its own requirements and enforcement mechanisms.

Conventional approaches to controlling rogue agent actions are predominantly reactive, often addressing issues only after they have occurred, which can be too late to prevent significant damage. The conventional approaches typically include post-incident analysis and remediation, where human reviewers or automated systems respond to unauthorized or harmful actions taken by agents. By the time these actions are detected, the rogue agents may have already caused substantial harm, such as data breaches, financial losses, or operational disruptions. The reactive approach enables rogue agents to operate unchecked during high-risk periods that may exacerbate the damage.

Attempting to create a system to validate agents using an AI model in view of the available conventional approaches created significant technological uncertainty. Creating such a system required addressing several unknowns in conventional approaches in compliance management, such as the difficulty in validating actions that agents create/propose on their own. Unlike traditional software systems that follow predefined rules and scripts, autonomous agents can generate and execute actions based on their programming, learned behaviors, and real-time environmental inputs. The self-directed decision-making process makes it challenging to predict and validate every possible action an agent might or could take. Conventional validation methods, which often rely on static rules and post-incident reviews, are inadequate for managing the dynamic and unpredictable behaviors of autonomous agents, whether they be working in isolation or in tandem with other agents. Static rules may fail to anticipate the wide range of scenarios and decisions that an autonomous agent may encounter and/or create in real time. As a result, conventional methods often fail to detect and prevent unauthorized or harmful actions before they occur. Post-incident reviews, while useful for understanding and mitigating past issues, leave a gap that enables potential risks to manifest and cause significant damage before detection.

To overcome the technological uncertainties, the inventors systematically evaluated multiple design alternatives. For example, the inventors tested with AI models that monitor and analyze the actions of autonomous agents after the actions have been executed. The AI models can be trained to detect patterns and anomalies that indicate unauthorized or harmful actions. When such actions are identified, the system can flag them for review and take corrective measures to mitigate any potential damage. Further, the inventors tested using a set of predefined rules and boundaries to evaluate actions before the actions were executed. Each intended action can be compared against these rules to ensure the action falls within the authorized parameters set by human operators. If an action violates any of the rules, the action can be flagged and prevented from execution.

However, the reactive AI-based approach and the proactive rule-based approach proved to be inflexible and difficult to maintain. The reactive AI-based approach, while effective in identifying unauthorized actions after they occur, often resulted in delayed responses and required significant resources for post-incident analysis and correction. The delay in detection and response allowed potential damage to occur before corrective measures could be implemented. On the other hand, the proactive rule-based approach required constant updates and maintenance to ensure the rules remained relevant in view of evolving scenarios and regulatory changes. The static nature of rule-based systems further struggled to anticipate and adapt to the range of dynamic and unpredictable behaviors exhibited by autonomous agents. Thus, the inventors experimented with different methods for proactively validating agent actions using an AI model. For example, the inventors used machine learning algorithms to predict and assess the potential outcomes of each action before the action is executed. Additionally, the inventors integrated a feedback loop that runs the proposed actions and potential modifications through the various validation layers until the actions satisfy the validation tests.

The disclosed system is a proactive validation layer (e.g., within the data generation platform) that continuously monitors and evaluates the actions of autonomous agents (e.g., external to the data generation platform) in near real time. The disclosed system receives a set of alphanumeric characters (e.g., boundaries, regulations, guidelines, and so forth) defining constraints and operational data for a set of agents. Each agent (AI-based or not AI-based) uses predefined objectives to generate proposed actions. The operational data can include the prompt, documents (e.g., documents stored in VectorDB, Structured Query Language (SQL) databases, data from message-oriented middleware (MOM) (e.g., TIBCO, KAFKA), proposed actions, AI model outputs, predefined objectives, and/or interacting software applications. The disclosed system dynamically evaluates and tests agent behaviors to ensure that the behaviors remain within predefined boundaries and/or comply with regulatory standards. For example, AI model(s) can evaluate an agent by mapping the agent and/or the proposed actions to a risk category using the operational data and alphanumeric characters. The system can generate expected actions from the alphanumeric characters The system can identify gaps, or deficiencies in the agent's proposed actions, by comparing expected actions with proposed actions. AI model(s) (same or different) can use the identified gaps to modify the proposed actions by adding, altering, or removing actions. The agents can execute the modified actions autonomously on the software applications.

By intercepting and examining each action before execution, the disclosed system can prevent unauthorized actions, enforce compliance, detect anomalous or unexpected behavior, and/or detect biases, thereby significantly reducing the risk of harmful outcomes. Further, the disclosed system provides audit trails to maintain transparency for the agent's actions. The audit trails can record the actions taken by the agents, along with the validation layer's tests on the actions. Additionally, by continuously updating the validation criteria based on evolving standards, the disclosed system reduces the risk of non-compliance.

Non-compliance of AI applications is further complicated as guidelines (e.g., regulations, standards) increasingly become more complex (e.g., protections against bias, harmful language, intellectual property (IP) rights). For example, guidelines can include requirements that require AI applications to produce outputs that are free from bias, harmful language, and/or IP rights violations to uphold ethical standards and protect users. Traditional approaches to regulatory compliance often involve manual interpretation of regulatory texts, followed by ad hoc efforts to align AI systems with compliance requirements. However, the manual process is subjective, lacks scalability, and is error-prone, which makes the approach increasingly unsustainable in the face of growing guidelines and the rapidly increasing prevalence of AI applications.

As such, the inventors have further developed a system (e.g., within the data generation platform) to provide a systematic and automated approach to assess and ensure adherence to guidelines (e.g., preventing bias, harmful language, IP violations). The disclosed technology addresses the complexities of compliance for AI applications. In some implementations, the system uses a meta-model that consists of one or more models to analyze different aspects of AI-generated content. For example, one of the models can be trained to identify certain patterns (e.g., patterns indicative of bias) within the content by evaluating demographic attributes and characteristics present in the content. By quantifying biases within the training dataset, the system can effectively scan content for disproportionate associations with demographic attributes and provide insights into potential biases that can impact the fairness and equity of AI applications. In some implementations, the system generates actionable validation actions (e.g., test cases) that operate as input into the AI model for evaluating AI application compliance. The system evaluates the AI application against the set of validation actions and generates one or more compliance indicators and/or a set of actions based on comparisons between expected and actual outcomes and explanations. In some implementations, the system can incorporate a correction module that automates the process of implementing corrections to remove non-compliant content from AI models. The correction module adjusts the parameters of the AI model and/or updates training data based on the findings of the detection models to ensure that non-compliant content is promptly addressed and mitigated. Unlike manual processes that rely on humans to interpret guidelines and assess compliance, the system can detect subtleties that traditional methods for content moderation often struggle to identify.

In cases where non-compliance is detected, conventional approaches to mapping gaps (e.g., issues) in controls (e.g., a set of expected actions) to operative standards (e.g., obligations, criteria, measures, principles, conditions) heavily rely on manually mapping each gap to one or more operative standards. Gaps represent situations where an expected control is either absent or not functioning properly, such as the failure to establish a specific framework within an organization. Operative standards contain controls that can be based on publications such as regulations, organizational guidelines, best practice guidelines, and others. Using manual processes heavily depends on individual knowledge and thus poses a significant risk for potential bias. This subjectivity can result in inconsistent mappings, as different individuals may understand and apply operative standards such as regulatory requirements in varied ways. Further, the sheer volume of identified gaps complicates traditional compliance efforts. Manually managing such a vast number of gaps is not only labor-intensive but also prone to oversights. Another significant disadvantage of traditional methods is the static nature of the mapping process. Conventional approaches often fail to account for the dynamic and evolving nature of regulatory requirements and organizational controls.

As such, the inventors have further developed a system (e.g., an engine within the data generation platform) to use generative AI (e.g., GAI, GenAI, generative artificial intelligence) models, such as an LLM in the above-described data generation platform, to map gaps in controls to corresponding operative standards. The system determines a set of vector representations of alphanumeric characters represented by one or more operative standards, which contain a first set of actions adhering to constraints in the set of vector representations. The system receives, via a user interface, an output generation request that includes an input with a set of gaps associated with scenarios failing to satisfy operative standards of the set of vector representations. Using the received input, the system constructs a set of prompts for each gap, where the set of prompts for a particular gap includes the set of attributes defining the scenario and the first set of actions of the operative standards. Each prompt can compare the corresponding gap against the first set of actions of the operative standards or the set of vector representations. For each gap, the system maps the gap to one or more operative standards of the set of vector representations by supplying the prompt into the LLM and, in response, receiving from the LLM a gap-specific set of operative standards that include the operative standards associated with the particular gap. The system, as compared to conventional approaches, reduces reliance on individual knowledge, thus minimizing personal biases and resulting in more uniform mappings across different individuals and teams. Additionally, the system can efficiently handle the large volumes of gaps that organizations face, significantly mitigating the labor-intensive nature of manual reviews.

Further, in cases where non-compliance is detected, conventional approaches to identifying actionable items from guidelines present several challenges. Typically, conventional methods include either human reviewers or automated systems processing guidelines in a linear fashion. The conventional linear approach often leads to an overwhelming number of actionable items being identified. Furthermore, conventional approaches lack the ability to dynamically adapt to changes in guidelines over time. When new guidelines are introduced or existing ones are updated, conventional systems typically simply add new actionable items without reassessing the overall set of actionable items to ensure that the new actionable items are not redundant or contradictory to previously set actionable items. The conventional approach further fails to account for subtle shifts in interpretation that may arise from changes in definitions or regulatory language, potentially leading to outdated or irrelevant requirements remaining on the list. Consequently, organizations may end up with an inflated and confusing set of actionable items that do not accurately reflect the current landscape of the guidelines (e.g., the current regulatory landscape).

As such, the inventors have further developed a system (e.g., an engine within the data generation platform) to use generative AI models, such as an LLM in the above-described data generation platform, to identify actionable items from guidelines. The system receives, from a user interface, an output generation request that includes an input for generating an output using an LLM. The guidelines are partitioned into multiple text subsets based on predetermined criteria, such as the length or complexity of each text subset. Using the partitioned guidelines, the system constructs a set of prompts for each text subset. Each text subset can be mapped to one or more actions in the first set of actions. Subsequent actions in this second set can be generated based on previous actions. The system generates a third set of actions by aggregating the corresponding second set of actions for each text subset. Unlike conventional linear processes that result in an overwhelming number of redundant actionable items, by heuristically analyzing guidelines, the system can identify common actionable items without parsing through the guideline documents word by word. The disclosed system reduces the number of identified actionable items to only relevant actionable items. Moreover, the system's dynamic and context-aware nature allows the system to respond to changes in guidelines over time by reassessing and mapping shifts in actionable items as the shifts occur.

While the current description provides examples related to LLMs, one of skill in the art would understand that the disclosed techniques can apply to other forms of machine learning or algorithms, including unsupervised, semi-supervised, supervised, and reinforcement learning techniques. For example, the disclosed data generation platform can use model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Data Generation Platform

FIG. 1 shows an illustrative environment 100 for evaluating machine learning model inputs (e.g., language model prompts) and outputs for model selection and validation, in accordance with some implementations of the present technology. For example, the environment 100 includes the data generation platform 102, which is capable of communicating with (e.g., transmitting or receiving data to or from) a data node 104 and/or third-party databases 108a-108n via a network 150. The data generation platform 102 can include software, hardware, or a combination of both and can reside on a physical server or a virtual server (e.g., as described in FIG. 3) running on a physical computer system. For example, the data generation platform 102 can be distributed across various nodes, devices, or virtual machines (e.g., as in a distributed cloud server). In some implementations, the data generation platform 102 can be configured on a user device (e.g., a laptop computer, smartphone, desktop computer, electronic tablet, or another suitable user device). Furthermore, the data generation platform 102 can reside on a server or node and/or can interface with third-party databases 108a-108n directly or indirectly.

The data node 104 can store various data, including one or more machine learning models, prompt validation models, associated training data, user data, performance metrics and corresponding values, validation criteria, and/or other suitable data. For example, the data node 104 includes one or more databases, such as an event database (e.g., a database for storage of records, logs, or other information associated with LLM-related user actions), a vector database, an authentication database (e.g., storing authentication tokens associated with users of the data generation platform 102), a secret database, a sensitive token database, and/or a deployment database.

An event database can include data associated with events relating to the data generation platform 102. For example, the event database stores records associated with users' inputs or prompts for generation of an associated natural language output (e.g., prompts intended for processing using an LLM). The event database can store timestamps and the associated user requests or prompts. In some implementations, the event database can receive records from the data generation platform 102 that include model selections/determinations, prompt validation information, user authentication information, and/or other suitable information. For example, the event database stores platform-level metrics (e.g., bandwidth data, central processing unit (CPU) usage metrics, and/or memory usage associated with devices or servers associated with the data generation platform 102). By doing so, the data generation platform 102 can store and track information relating to performance, errors, and troubleshooting. The data generation platform 102 can include one or more subsystems or subcomponents. For example, the data generation platform 102 includes a communication engine 112, an access control engine 114, a breach mitigation engine 116, a performance engine 118, and/or a generative model engine 120.

A vector database can include data associated with vector embeddings of data. For example, the vector database includes a numerical representation (e.g., arrays of values) that represent the semantic meaning of unstructured data (e.g., text data, audio data, or other similar data). For example, the data generation platform 102 receives inputs such as unstructured data, including text data, such as a prompt, and utilizes a vector encoding model (e.g., with a transformer or neural network architecture) to generate vectors within a vector space that represent meaning of data objects (e.g., of words within a document). By storing information within a vector database, the data generation platform 102 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the data generation platform 102 or associated development pipeline. For example, the authentication database stores keys (e.g., public keys that match private keys linked to users and/or devices). The authentication database can include other user or device information (e.g., user identifiers, such as usernames, or device identifiers, such as medium access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as application programming interface (API) keys, passwords, credentials, or other such information. For example, sensitive information includes personally identifiable information (PII), such as names, identification numbers, or biometric information. By storing secrets or other sensitive information, the data generation platform 102 can evaluate prompts and/or outputs to prevent breaches or leakage of such sensitive information.

A deployment database can include data associated with deploying, using, or viewing results associated with the data generation platform 102. For example, the deployment database can include a server system (e.g., physical or virtual) that stores validated outputs or results from one or more LLMs, where such results can be accessed by the requesting user.

The data generation platform 102 can receive inputs (e.g., prompts), training data, validation criteria, and/or other suitable data from one or more devices, servers, or systems. The data generation platform 102 can receive such data using communication engine 112, which can include software components, hardware components, or a combination of both. For example, the communication engine 112 includes or interfaces with a network card (e.g., a wireless network card and/or a wired network card) that is associated with software to drive the card and enables communication with network 150. In some implementations, the communication engine 112 can also receive data from and/or communicate with the data node 104, or another computing device. The communication engine 112 can communicate with the access control engine 114, the breach mitigation engine 116, the performance engine 118, and the generative model engine 120.

In some implementations, the data generation platform 102 can include the access control engine 114. The access control engine 114 can perform tasks relating to user/device authentication, controls, and/or permissions. For example, the access control engine 114 receives credential information, such as authentication tokens associated with a requesting device and/or user. In some implementations, the access control engine 114 can retrieve associated stored credentials (e.g., stored authentication tokens) from an authentication database (e.g., stored within the data node 104). The access control engine 114 can include software components, hardware components, or a combination of both. For example, the access control engine 114 includes one or more hardware components (e.g., processors) that are able to execute operations for authenticating users, devices, or other entities (e.g., services) that request access to an LLM associated with the data generation platform 102. The access control engine 114 can directly or indirectly access data, systems, or nodes associated with the third-party databases 108a-108n and can transmit data to such nodes. Additionally or alternatively, the access control engine 114 can receive data from and/or send data to the communication engine 112, the breach mitigation engine 116, the performance engine 118, and/or the generative model engine 120.

The breach mitigation engine 116 can execute tasks relating to the validation of inputs and outputs associated with the LLMs. For example, the breach mitigation engine 116 validates inputs (e.g., prompts) to prevent sensitive information leakage or malicious manipulation of LLMs, as well as to validate the security or safety of the resulting outputs. The breach mitigation engine 116 can include software components (e.g., modules/virtual machines that include prompt validation models, performance criteria, and/or other suitable data or processes), hardware components, or a combination of both. As an illustrative example, the breach mitigation engine 116 monitors prompts for the inclusion of sensitive information (e.g., PII), or other forbidden text, to prevent leakage of information from the data generation platform 102 to entities associated with the target LLMs. The breach mitigation engine 116 can communicate with the communication engine 112, the access control engine 114, the performance engine 118, the generative model engine 120, and/or other components associated with the network 150 (e.g., the data node 104 and/or the third-party databases 108a-108n).

The performance engine 118 can execute tasks relating to monitoring and controlling performance of the data generation platform 102 (e.g., or the associated development pipeline). For example, the performance engine 118 includes software components (e.g., performance monitoring modules), hardware components, or a combination thereof. To illustrate, the performance engine 118 can estimate performance metric values associated with processing a given prompt with a selected LLM (e.g., an estimated cost or memory usage). By doing so, the performance engine 118 can determine whether to allow access to a given LLM by a user, based on the user's requested output and the associated estimated system effects. The performance engine 118 can communicate with the communication engine 112, the access control engine 114, the performance engine 118, the generative model engine 120, and/or other components associated with the network 150 (e.g., the data node 104 and/or the third-party databases 108a-108n).

The generative model engine 120 can execute tasks relating to machine learning inference (e.g., natural language generation based on a generative machine learning model, such as an LLM). The generative model engine 120 can include software components (e.g., one or more LLMs, and/or API calls to devices associated with such LLMs), hardware components, and/or a combination thereof. To illustrate, the generative model engine 120 can provide users' prompts to a requested, selected, or determined model (e.g., LLM) to generate a resulting output (e.g., to a user's query within the prompt). As such, the generative model engine 120 enables flexible, configurable generation of data (e.g., text, code, or other suitable information) based on user input, thereby improving the flexibility of software development or other such tasks. The generative model engine 120 can communicate with the communication engine 112, the access control engine 114, the performance engine 118, the generative model engine 120, and/or other components associated with the network 150 (e.g., the data node 104 and/or the third-party databases 108a-108n).

Engines, subsystems, or other components of the data generation platform 102 are illustrative. As such, operations, subcomponents, or other aspects of particular subsystems of the data generation platform 102 can be distributed, varied, or modified across other engines. In some implementations, particular engines can be deprecated, added, or removed. For example, operations associated with breach mitigation are performed at the performance engine 118 instead of at the breach mitigation engine 116.

Suitable Computing Environments for the Data Generation Platform

Figure 2:
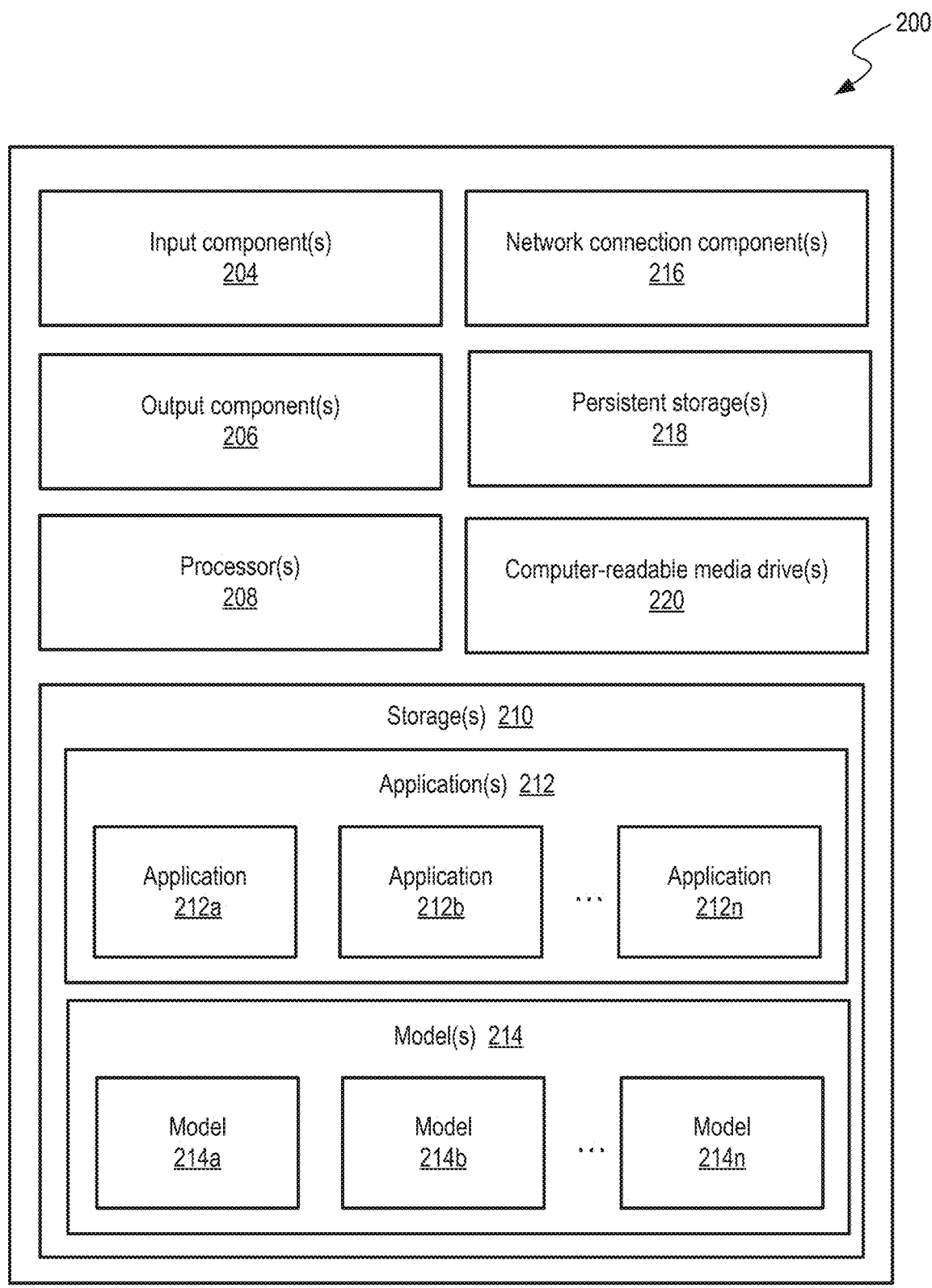
FIG. 2 is a block diagram showing some of the components typically incorporated in at least some of the computer systems and other devices on which the disclosed system operates.

FIG. 2 is a block diagram showing some of the components typically incorporated into at least some of the computer systems and other devices 200 on which the disclosed system (e.g., the data generation platform 102) operates in accordance with some implementations of the present technology. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, track pads, mice, compact disc (CD) drives, digital video disc (DVD) drives, 3.5 mm input jack, High-Definition Multimedia Interface (HDMI) input connections, Video Graphics Array (VGA) input connections, Universal Serial Bus (USB) input connections, or other computing input components; output components 206, including display screens (e.g., liquid crystal displays (LCDs), organic light-emitting diodes (OLEDs), cathode ray tubes (CRTs), etc.), speakers, 3.5 mm output jack, lights, light-emitting diodes (LEDs), haptic motors, or other output-related components; processor(s) 208, including a CPU for executing computer programs, a graphics processing unit (GPU) for executing computer graphic programs and handling computing graphical elements; storage(s) 210, including at least one computer memory for storing programs (e.g., application(s) 212 including applications 212a-212n, model(s) 214 including models 214a-214n, and other programs) and data while they are being used, including the facility and associated data, an operating system including a kernel, and device drivers; network connection component(s) 216 for the computer system to communicate with other computer systems and to send and/or receive data, such as via the internet or another network and its networking hardware, such as switches, routers, repeaters, electrical cables and optical fibers, light emitters and receivers, radio transmitters and receivers, and the like; persistent storage(s) 218, such as a hard drive or flash drive for persistently storing programs and data; and computer-readable media drive(s) 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility can be implemented using devices of various types and configurations and having various components.

Figure 3:
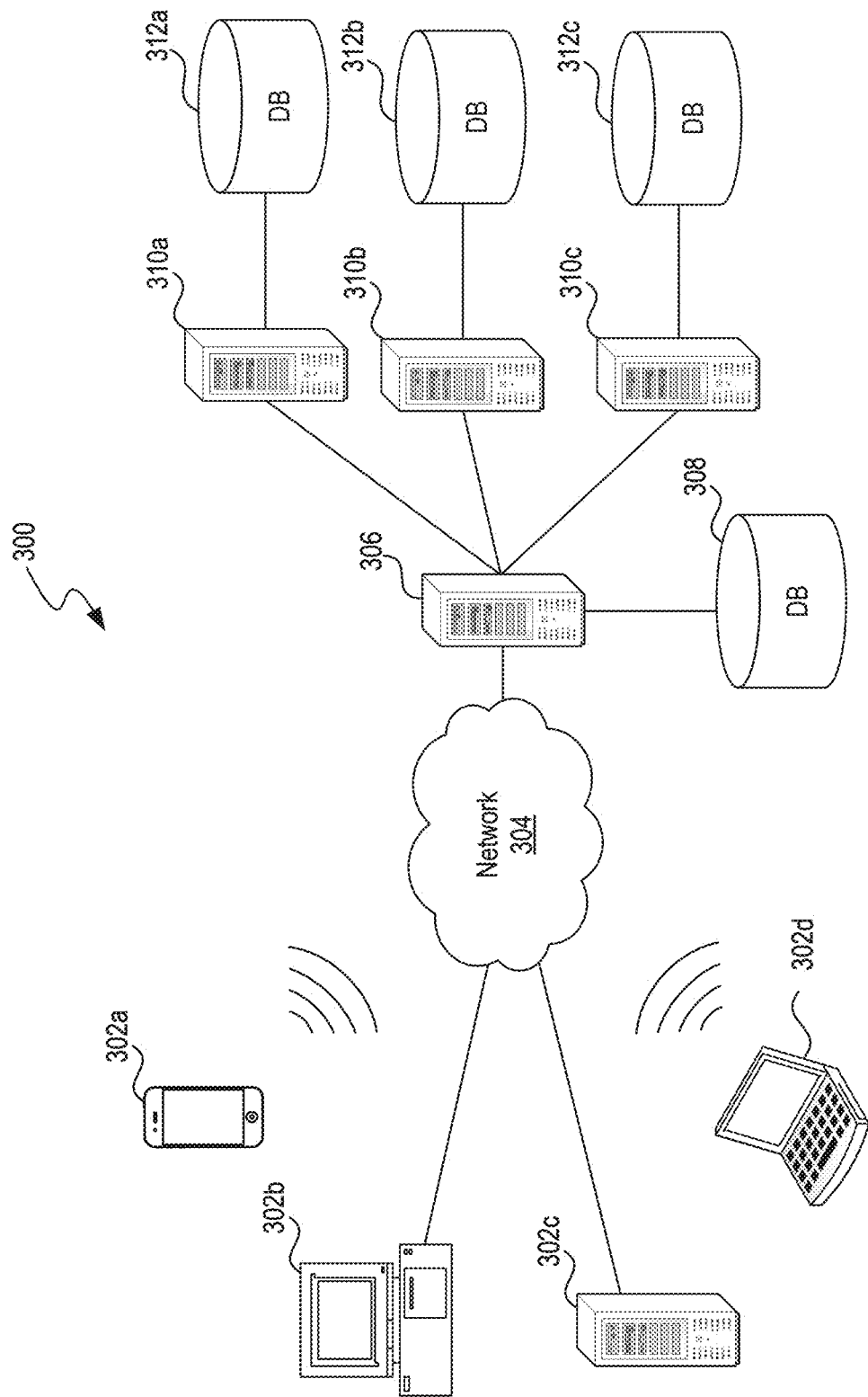
FIG. 3 is a system diagram illustrating an example of a computing environment in which the disclosed system operates.

FIG. 3 is a system diagram illustrating an example of a computing environment 300 in which the disclosed system operates in some implementations of the present technology. In some implementations, environment 300 includes one or more client computing devices 302 (shown as client computing devices 302a-302d), examples of which can host graphical user interfaces (GUIs) associated with client devices. For example, one or more of the client computing devices 302a-302d include user devices and/or devices associated with services requesting responses to queries from LLMs. Client computing devices 302 operate in a networked environment using logical connections through network 304 (e.g., the network 150 of FIG. 1) to one or more remote computers, such as a server computing device (e.g., a server system housing the data generation platform 102 of FIG. 1). In some implementations, client computing devices 302 can correspond to device 200 (FIG. 2).

The computing environment 300 includes a server computing device 306. In some implementations, server computing device 306 is an edge server that receives client requests and coordinates fulfillment of those requests through other servers, such as server computing devices 310 (shown as server computing devices 310a-310c). In some implementations, server computing devices 306 and 310 comprise computing systems. Though each server computing device 306 and 310 is displayed logically as a single server, each server computing device can be a distributed computing environment encompassing multiple computing devices located at the same or at geographically disparate physical locations. In some implementations, each server computing device 310 corresponds to a group of servers.

Each of the client computing devices 302 and server computing devices 306 and 310 can act as a server or client to other server or client devices. In some implementations, each of the server computing devices (306, 310) connects to a corresponding database (308, 312 (shown as databases 312a-312c)). For example, the corresponding database includes a database stored within the data node 104 (e.g., a sensitive token database, an event database, or another suitable database). As discussed above, each server computing device 310 can correspond to a group of servers, and each of these servers can share a database or can have its own database (and/or interface with external databases, such as third-party databases 108a-108n). In addition to information described concerning the data node 104 of FIG. 1, databases 308 and 312 can warehouse (e.g., store) other suitable information, such as sensitive or forbidden tokens, user credential data, authentication data, graphical representations, code samples, system policies or other policies, templates, computing languages, data structures, software application identifiers, visual layouts, computing language identifiers, mathematical formulae (e.g., weighted average, weighted sum, or other mathematical formulas), graphical elements (e.g., colors, shapes, text, images, multimedia), system protection mechanisms (e.g., prompt validation model parameters or criteria), software development or data processing architectures, machine learning models, AI models, training data for AI/machine learning models, historical information, or other information.

Though databases 308 and 312 are displayed logically as single units, each of the databases 308 and 312 can be a distributed computing environment encompassing multiple computing devices, can be located within their corresponding server, or can be located at the same or at geographically disparate physical locations.

Network 304 (e.g., corresponding to the network 150) can be a local area network (LAN) or a wide area network (WAN) but can also be other wired or wireless networks. In some implementations, network 304 is the internet or some other public or private network. Client computing devices 302 are connected to network 304 through a network interface, such as by wired or wireless communication. While the connections between server computing device 306 and server computing devices 310 are shown as separate connections, these connections can be any kind of LAN, WAN, wired network, or wireless network, including network 304 or a separate public or private network.

Example Implementations of Models in the Data Generation Platform

Figure 4:
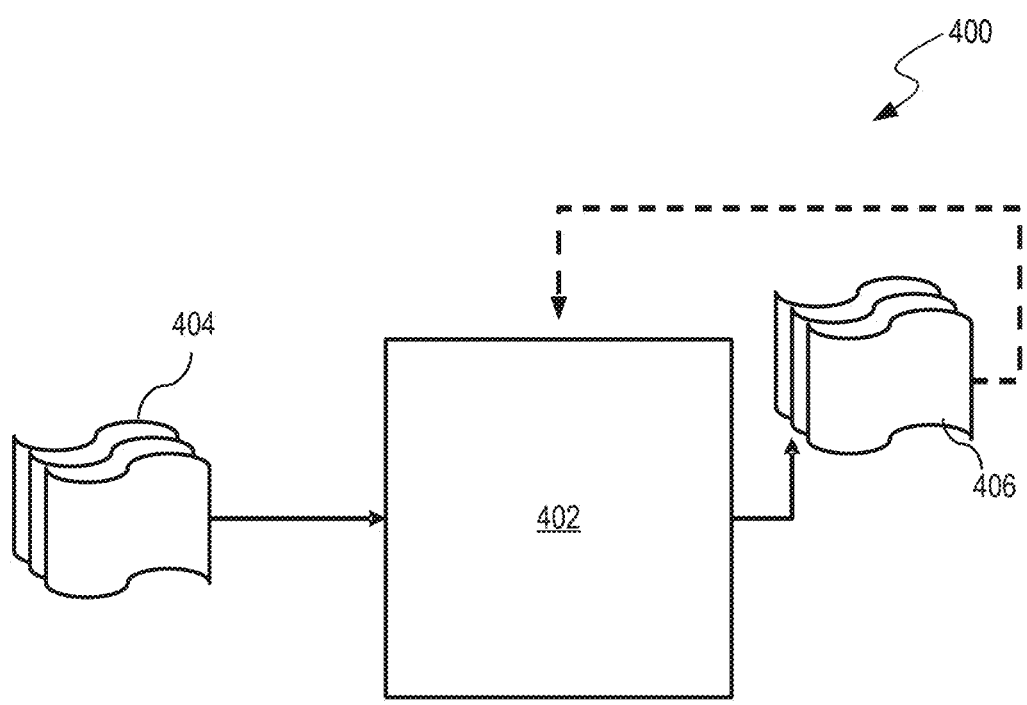
FIG. 4 is a diagram of an example artificial intelligence (AI) model.

FIG. 4 is a diagram of an AI model, in accordance with some implementations of the present technology. AI model 400 is shown. In some implementations, AI model 400 can be any AI model. In some implementations, AI model 400 can be part of, or work in conjunction with, server computing device 306 (FIG. 3). For example, server computing device 306 can store a computer program that can use information obtained from AI model 400, provide information to AI model 400, or communicate with AI model 400. In other implementations, AI model 400 can be stored in database 308 and can be retrieved by server computing device 306 to execute/process information related to AI model 400, in accordance with some implementations of the present technology.

In some implementations, AI model 400 can be a machine learning model 402. Machine learning model 402 can include one or more neural networks or other machine learning models. As an example, neural networks can be based on a large collection of neural units (or artificial neurons). Neural networks can loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit can have a summation function that combines the values of all its inputs together. In some implementations, each connection (or the neural unit itself) can have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, backpropagation techniques can be utilized by the neural networks, where forward stimulation is used to reset weights on the "front" neural units. In some implementations, stimulation and inhibition for neural networks can be more free-flowing, with connections interacting in a more chaotic and complex fashion.

As an example, with respect to FIG. 4, machine learning model 402 can take inputs 404 and provide outputs 406. In one use case, outputs 406 can be fed back to machine learning model 402 as input to train machine learning model 402 (e.g., alone or in conjunction with user indications of the accuracy of outputs 406, labels associated with the inputs, or other reference feedback information). In another use case, machine learning model 402 can update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights can be adjusted to reconcile differences between the neural network's prediction and the reference feedback. In a further use case, one or more neurons (or nodes) of the neural network can require that their respective errors are sent backward through the neural network to them to facilitate the update process (e.g., backpropagation of error). Updates to the connection weights can, for example, be reflective of the magnitude of error propagated backward after a forward pass has been completed. In this way, for example, the machine learning model 402 can be trained to generate better predictions.

As an example, where the prediction models include a neural network, the neural network can include one or more input layers, hidden layers, and output layers. The input and output layers can respectively include one or more nodes, and the hidden layers can each include a plurality of nodes. When an overall neural network includes multiple portions trained for different objectives, there may or may not be input layers or output layers between the different portions. The neural network can also include different input layers to receive various input data. Also, in differing examples, data can be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links can correspond to the number of the nodes included in the subsequent layer. For example, in adjacent fully connected layers, each node of a current layer can have a respective link to each node of the subsequent layer, noting that in some examples such full connections can later be pruned or minimized during training or optimization. In a recurrent structure, a node of a layer can be again input to the same node or layer at a subsequent time, while in a bi-directional structure, forward and backward connections can be provided. The links are also referred to as connections or connection weights, referring to the hardware-implemented connections or the corresponding "connection weights" provided by those connections of the neural network. During training and implementation, such connections and connection weights can be selectively implemented, removed, and varied to generate or obtain a resultant neural network that is thereby trained and that can be correspondingly implemented for the trained objective, such as for any of the above example recognition objectives.

Figure 5:
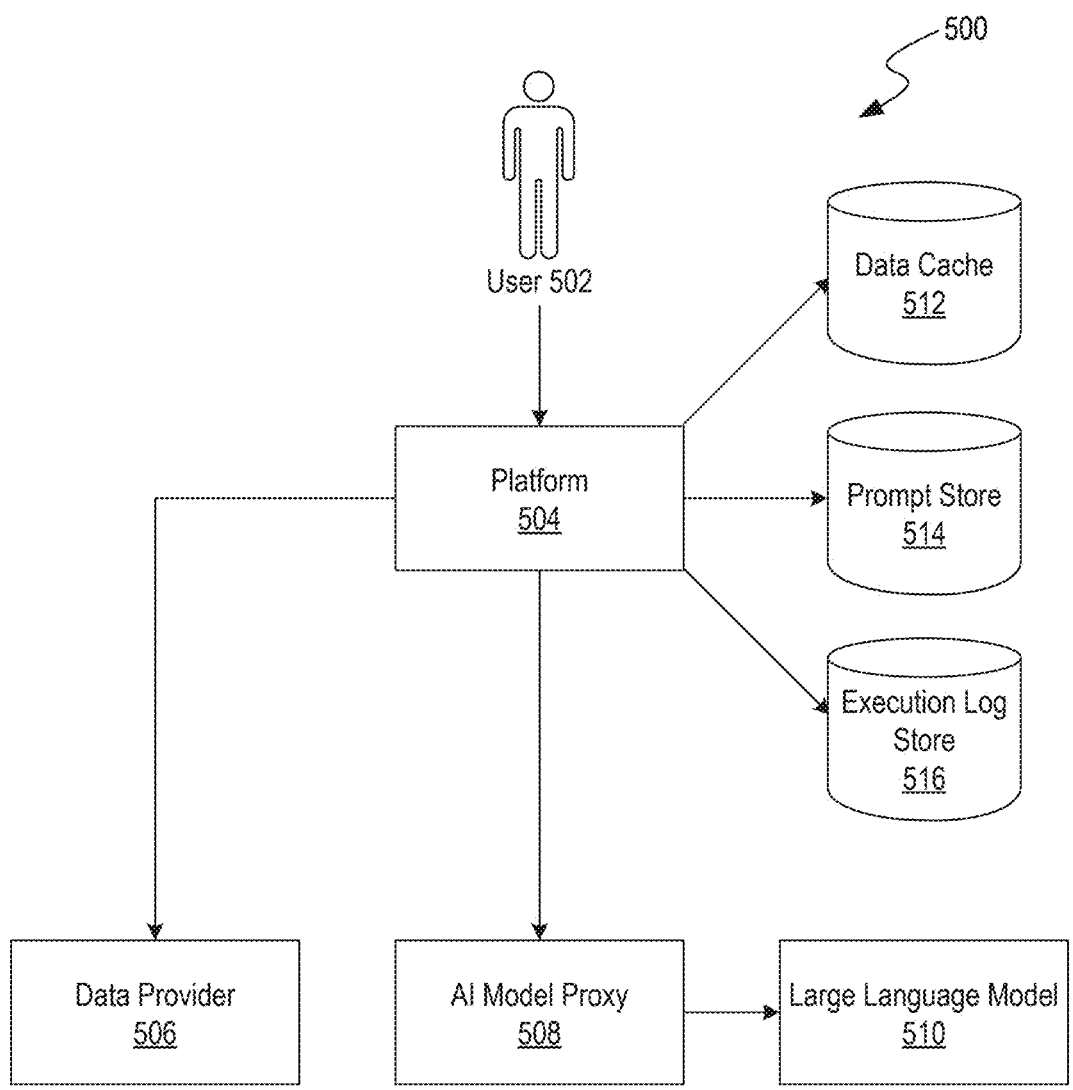
FIG. 5 is an illustrative diagram illustrating an example environment of a platform for automatically managing guideline compliance.

Mapping Gaps in Controls to Operative Standards Using the Data Generation Platform FIG. 5 is an illustrative diagram illustrating an example environment 500 of a platform for automatically managing guideline compliance, in accordance with some implementations of the present technology. Example environment 500 includes user 502, platform 504, data provider 506, AI model proxy 508, large language model (LLM) 510, data cache 512, prompt store 514, and execution log store 516. Platform 504 is implemented using components of example devices 200 and client computing devices 302 illustrated and described in more detail with reference to FIG. 2 and FIG. 3, respectively. Likewise, implementations of example environment 500 can include different and/or additional components or can be connected in different ways.

User 502 interacts with the platform 504 via, for example, a user interface. Platform 504 can be the same as or similar to data generation platform 102 discussed with reference to FIG. 1. User 502 can input data, configure compliance parameters, and manage guideline compliance performance through an intuitive interface provided by the platform 504. The platform 504 can perform a variety of compliance management tasks, such as compliance checks and regulatory analyses.

Data provider 506 supplies the platform 504 with the data used in the management of the guideline compliance, which can include regulatory guidelines, compliance requirements, organizational guidelines, and other relevant information. The data supplied by data provider 506 can be accessed via an application programming interface (API) or database that contains policies, obligations, and/or controls in operative standards. In some implementations, the data supplied by data provider 506 contains the publications (e.g., regulatory guidelines, compliance requirements, organizational guidelines) themselves. The structured repository of data provider 506 allows platform 504 to efficiently retrieve and use the data in different management processes. In some implementations, data provider 506 includes existing mappings associated with the operative standards. For example, the pre-established mappings can be between the operative standards and gaps (e.g., issues). In another example, the pre-established mappings can be between the operative standards and publications. Using the existing relationships, the platform 504 can more efficiently map particular identified gaps to the relevant operative standards. For example, if a newly identified gap is similar to or the same as a previously identified gap (e.g., shares similar scenario attributes, metadata tags) within the pre-existing mappings, the platform 504 can use the pre-existing mapping of the previously identified gap to more easily identify the mapping for the newly identified gap.

AI model proxy 508 is an intermediary between the platform 504 and the LLM 510. AI model proxy 508 facilitates the communication and data exchange between the platform 504 and the LLM 510. AI model proxy 508, in some implementations, operates as a plug-in to interconnect the platform 504 and the LLM 510. The AI model proxy 508, in some implementations, includes distinct modules, such as data interception, inspection, or action execution. In some implementations, containerization methods such as Docker are used within the AI model proxy 508 to ensure uniform deployment across environments and minimize dependencies. The LLM 510 analyzes data input by user 502 and data obtained from data provider 506 to identify patterns and generate compliance-related outputs. The AI model proxy 508, in some implementations, enforces access control policies to safeguard sensitive data and functionalities exposed to the LLM 510. For example, the AI model proxy 508 can sanitize the data received from the platform 504 using encryption standards, token-based authentication, and/or role-based access controls (RBACs) to protect sensitive information. The data received can be encrypted to ensure that all sensitive information is transformed into an unreadable format, accessible only through decryption with the appropriate keys. Token-based authentication can be used by generating a unique token for each user session or transaction. The token acts as a digital identifier by verifying the user's identity and granting access to specific data or functions within the system. Additionally, RBACs can restrict data access based on the user's role within the organization. Each role can be assigned specific permissions to ensure that users only access data relevant to the users' responsibilities.

In some implementations, AI model proxy 508 employs content analysis to discern between the sensitive and non-sensitive by identifying specific patterns, keywords, or formats indicative of sensitive information. In some implementations, the list of indicators of sensitive information is generated by an internal generative AI model within the platform 504 (e.g., with a command set that resembles "generate a plurality of examples of PII"). The generative AI model can be trained on a dataset containing examples of sensitive data elements, such as personally identifiable information (PII), financial records, or other confidential information. Once the AI model has been trained, the AI model can generate indicators (e.g., specific patterns, keywords, or formats) of sensitive information based on the model's learned associations. For example, gap data that includes sensitive financial information such as account numbers, transaction details, and personal information of stakeholders can be identified and subsequently removed and/or masked.

Data cache 512 can store data for a period of time to reduce the time required to access frequently used information. Data cache 512 ensures that the system can quickly retrieve necessary data without repeatedly querying the data provider 506, thus improving the overall efficiency of platform 504. In some implementations, a caching strategy is implemented that includes cache eviction policies, such as least recently used (LRU) or time-based expiration, to ensure that the cache remains up-to-date and responsive while optimizing memory usage. LRU allows the data cache 512 to keep track of which data items have been accessed most recently. When the data cache 512 reaches maximum capacity and needs to evict an item (e.g., data packets) to make room for new data, the data cache 512 will remove the least recently used item. Time-based expiration involves setting a specific time duration for which data items are considered valid in the data cache 512. Once this duration expires, the data item is automatically invalidated and removed from the data cache 512 to preserve space in the data cache 512.

Prompt store 514 contains predefined prompts that guide the LLM 510 in processing data and generating outputs. Prompt store 514 is a repository for pre-existing prompts that are stored in a structured and accessible format (e.g., using distributed databases or NoSQL stores), which allows for efficient retrieval and utilization by the AI model. In some implementations, the prompts are preprocessed to remove any irrelevant information, standardize the format, and/or organize the prompts into a structured database schema. In some implementations, prompt store 514 is a vector store where the prompts are vectorized and stored in a vector space model, and each prompt is mapped to a high-dimensional vector representing the prompt's semantic features and relationships with other prompts. In some implementations, the prompts are stored using graph databases such as Neo4j™ or Amazon Neptune™. Graph databases represent data as nodes and edges, allowing for the modeling of relationships between prompts to demonstrate the interdependencies. In some implementations, the prompts are stored in a distributed file system such as Apache Hadoop™ or Google Cloud Storage™. These systems offer scalable storage for large volumes of data and support parallel processing and distributed computing. Prompts stored in a distributed file system can be accessed and processed by multiple nodes simultaneously, which allows for faster retrieval and analysis by the system. For example, the details of a particular gap, such as relevant metrics, severity level, and/or specific publication references, can be used to structure a prompt for the LLM 510 by inserting the details into appropriate places in the predefined prompt.

Execution log store 516 records some or all actions and processes executed by the platform 504. Execution log store 516 can serve as an audit trail, providing a history of compliance activities and decisions made by the platform 504. Each logged entry in execution log store 516 can include details such as timestamps, user identifiers, specific actions performed, and relevant contextual information. Execution log store 516, in some implementations, can be accessed via the platform 504 via an API.

Figure 6:
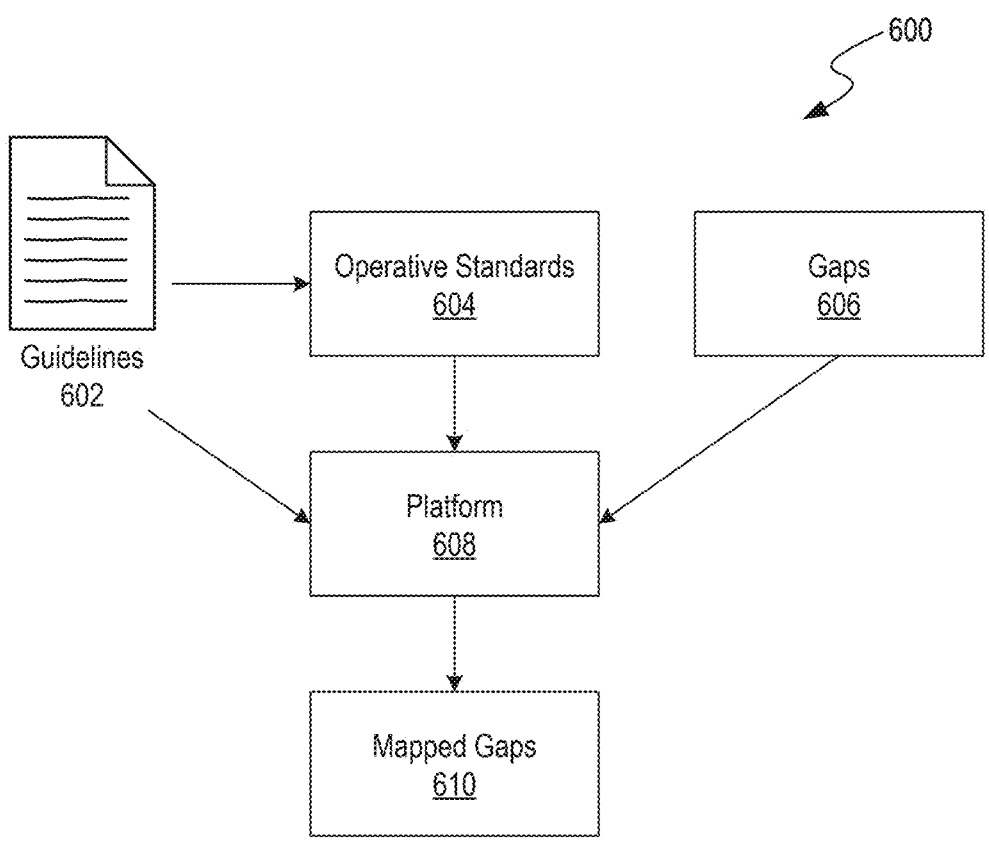
FIG. 6 is an illustrative diagram illustrating an example environment of the platform using guidelines and gaps in controls to generate mapped gaps.

FIG. 6 is an illustrative diagram illustrating an example environment 600 of the platform using guidelines and gaps in controls to generate mapped gaps, in accordance with some implementations of the present technology. Example environment 600 includes guidelines 602, operative standards 604, gaps 606, platform 608, and mapped gaps 610. Platform 608 is the same as or similar to platform 504 discussed with reference to FIG. 5. Implementations of example environment 600 can include different and/or additional components or can be connected in different ways.

Guidelines 602 can include publications of regulations, standards, and policies that organizations adhere to. Guidelines 602 serve as the benchmark against which compliance is measured. Guidelines 602 can include publications such as jurisdictional guidelines and organizational guidelines. Jurisdictional guidelines (e.g., governmental regulations) can include guidelines gathered from authoritative sources such as government websites, legislative bodies, and regulatory agencies. Jurisdictional guidelines can be published in legal documents or official publications and cover aspects related to the development, deployment, and use of AI technologies within specific jurisdictions. For example, the California Consumer Privacy Act (CCPA) in the United States mandates cybersecurity measures such as encryption, access controls, and data breach notification requirements to protect personal data. As such, AI developers must implement cybersecurity measures (such as encryption techniques) within the AI models they design and build to ensure the protection of sensitive user data and compliance with the regulations. Organizational guidelines include internal policies, procedures, and guidelines established by organizations to govern activities within the organization's operations. Organizational guidelines can be developed in alignment with industry standards, legal requirements, best practices, and organizational objectives. For example, organizational guidelines can require AI models to include certain access controls to restrict unauthorized access to the model's APIs or data and/or have a certain level of resilience before deployment.

In some implementations, guidelines 602 can be in any one of text, image, audio, video, or other computer-ingestible format. For guidelines 602 that are not text (e.g., image, audio, and/or video), the guidelines 602 can first be transformed into text. Optical character recognition (OCR) can be used for images containing text, and speech-to-text algorithms can be used for audio inputs. For example, an audio recording detailing financial guidelines can be converted into text using a speech-to-text engine that allows the system to parse and integrate the text output into the existing guidelines 602. Similarly, a video demonstrating a particular procedure or protocol can be processed to extract textual information (e.g., extracting captions).

In some implementations, in cases where transforming to text is not feasible or desirable, the system can use vector comparisons to handle non-text inputs directly. For example, images and audio files can be converted into numerical vectors through feature extraction techniques (e.g., by using Convolutional Neural Networks (CNNs) for images and using Mel-Frequency Cepstral Coefficients (MFCCs) for audio files). The vectors represent the corresponding characteristics of the input data (e.g., edges, texture, or shapes of the image, or the spectral features of the audio file).

In some implementations, the guidelines 602 can be stored in a vector store. The vector store stores the guidelines 602 in a structured and accessible format (e.g., using distributed databases or NoSQL stores), which allows for efficient retrieval and utilization by the platform 608. In some implementations, the guidelines 602 are preprocessed to remove any irrelevant information, standardize the format, and/or organize the guidelines 602 into a structured database schema. Once the guidelines 602 are prepared, the guidelines 602 can be stored in a vector store using distributed databases or NoSQL stores. To store the guidelines 602 in the vector store, the guidelines 602 can be encoded into vector representations. The textual data of the guidelines 602 are transformed into numerical vectors that capture the semantic meaning and relationships between words or phrases in the guidelines 602. For example, the text is encoded into vectors using word embeddings and/or TF-IDF (Term Frequency-Inverse Document Frequency) encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF encoding calculates the importance of a word in a guideline relative to the word's frequency in the entire corpus of guidelines 602. For example, the system can assign higher weights to words that are more unique to a specific document and less common across the entire corpus.

In some implementations, the guidelines 602 are stored using graph databases such as Neo4j™ or Amazon Neptune™. Graph databases represent data as nodes and edges, allowing for the modeling of relationships between guidelines 602 to demonstrate the interdependencies. In some implementations, the guidelines 602 are stored in a distributed file system such as Apache Hadoop™ or Google Cloud Storage™. These systems offer scalable storage for large volumes of data and support parallel processing and distributed computing.

The vector store can be stored in a cloud environment hosted by a cloud provider, or in a self-hosted environment. In a cloud environment, the vector store has the scalability of cloud services provided by platforms (e.g., AWS™, Azure™). Storing the vector store in a cloud environment entails selecting the cloud service, provisioning resources dynamically through the provider's interface or APIs, and configuring networking components for secure communication. Cloud environments allow the vector store to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices. Conversely, in a self-hosted environment, the vector store is stored on a private web server. Deploying the vector store in a self-hosted environment entails setting up the server with the necessary hardware or virtual machines, installing an operating system, and storing the vector store. In a self-hosted environment, organizations have full control over the vector store, allowing organizations to implement customized financial measures and compliance policies tailored to the organization's specific needs. For example, organizations in industries with strict data privacy and security regulations, such as financial institutions, can mitigate security risks by storing the vector store in a self-hosted environment.

Operative standards 604 can be specific obligations derived from the guidelines to comply with the guidelines, and can encompass both specific actionable directives and general principles. In some examples, operative standards 604 can serve as actionable directives that organizations must adhere to in order to meet the requirements laid out in regulatory guidelines or industry best practices (e.g., guidelines 602). For example, an operative standard derived from a data protection guideline might mandate the adoption of a specific framework (e.g., General Data Protection Regulation (GDPR)) for handling personal data, outlining procedures for data access, encryption standards, and breach notification protocols. In another example, an operative standard can include prohibiting a certain action from being taken, such as transmitting confidential information to external sources. In further examples, operative standards 604 encompass the fundamental principles or benchmarks derived from guidelines that guide organizational practices and behaviors toward achieving desired outcomes. For example, in the context of ethical standards within a business, operative standards can include principles such as integrity, transparency, and accountability.

Gaps 606 are instances where the current controls or processes fall short of meeting the operative standards. Gaps 606 can be due to the absence of required controls or the inadequacy of existing controls. For example, in the context of data security, a gap may be identified if a company lacks a comprehensive data encryption policy despite regulatory requirements specifying encryption standards for sensitive information. In another example, though an organization may have implemented access controls for sensitive systems, a gap may be identified when the organization fails to regularly review and update user permissions as required by industry best practices, thereby leaving potential vulnerabilities unaddressed.

Gaps 606 can be managed through a systematic approach that incorporates self-reporting and comprehensive storage of attributes tailored to each scenario associated with the gap 606. A scenario of a gap 606 refers to a specific instance or situation where current controls or processes within an organization do not meet established operative standards 604. Each scenario associated with a gap 606 represents a distinct use case. For instance, a scenario can include a cybersecurity breach due to inadequate data encryption practices, or can include a compliance issue related to incomplete documentation of financial transactions. Each identified gap 606 can be documented with scenario attributes (e.g., metadata, tags) such as a descriptive title, severity level assessment (e.g., graded from 1 to 5, where 1 denotes severe and 5 signifies trivial), and/or tags linking the gap 606 to specific business units or regulatory requirements. The scenario attributes provide a clear understanding of the gap's impact and context. In some implementations, the platform 608 includes a user interface that allows users to input and edit the scenario attributes for each gap of the gaps 606.

Platform 608 receives the guidelines 602, operative standards 604, and/or identified gaps 606, and generates mapped gaps 610. The mapped gaps 610 correlate the identified gaps 606 with the specific operative standards 604 the identified gaps 606 fail to meet. Methods of mapping the identified gaps with the specific operative standards are further discussed with reference to FIG. 7.

Figure 7:
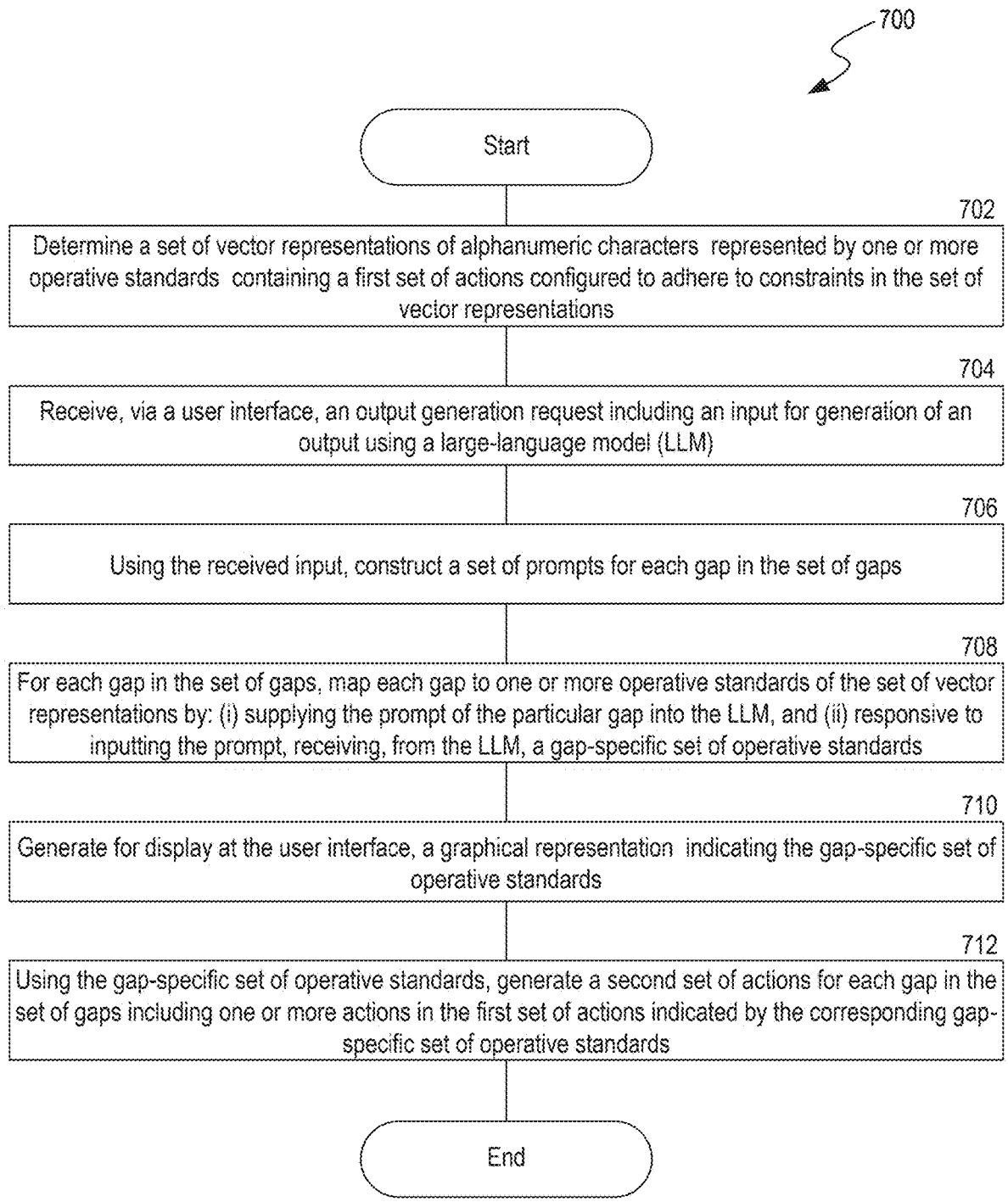
FIG. 7 is a flow diagram illustrating a process of mapping identified gaps in controls to operative standards.

FIG. 7 is a flow diagram illustrating a process 700 of mapping identified gaps in controls to operative standards, in accordance with some implementations of the present technology. In some implementations, the process 700 is performed by components of example devices 200 and client computing devices 302 illustrated and described in more detail with reference to FIG. 2 and FIG. 3, respectively. Particular entities, for example, LLM 510, are illustrated and described in more detail with reference to FIG. 5. Likewise, implementations can include different and/or additional steps or can perform the steps in different orders.

In act 702, the system determines a set of vector representations of alphanumeric characters represented by one or more operative standards containing a first set of actions configured to adhere to constraints in the set of vector representations. The set of vector representations of alphanumeric characters is the same as or similar to publications of guidelines 602 discussed with reference to FIG. 6. Methods of transforming different modes (e.g., text, image, audio, video) of guidelines into vector representations are discussed with reference to FIG. 6.

In some implementations, the system receives an indicator of a type of operation associated with the vector representations. The system identifies a relevant set of operative standards associated with the type of the vector representations. The system obtains the relevant set of operative standards, via an application programming interface (API). For example, the system includes input channels or interfaces capable of receiving signals or data tags that denote the type (e.g., nature or purpose) of the vector representations being processed. The system can use an API to retrieve the relevant set of operative standards by implementing API endpoints or integration points that connect the system to a centralized repository or database housing the operative standards that can be tagged with associated metadata related to the type of the vector representation.

In some implementations, the AI model is a first AI model. The system can supply the set of vector representations or the original publications of the guidelines into a second AI model (which can be the same as or different from the first AI model). In response, the system can receive, from the second AI model, a set of summaries summarizing the set of vector representations, where at least one prompt in the set of prompts includes one or more summaries in the set of summaries. The set of summaries is a representation of the set of vector representations. The set of summaries, in some implementations, serves as a distilled and coherent representation of the textual content derived from the set of vector representations. The set of summaries encapsulates the key themes, sentiments, or pertinent information embedded in the guidelines. The summarization process not only captures the essence of user sentiments but also allows for efficient comprehension and analysis. By condensing voluminous textual content into condensed summaries (e.g., the set of summaries), the system allows users to obtain a comprehensive and accessible understanding of the guidelines. For example, the prompt input into the second AI model can request a summary of the provided text or guidelines by including directives such as "Summarize the following text into key points," or "Provide a concise summary capturing the main themes and most important information." Additionally, the prompt can include context or specific aspects to focus on, such as "Provide the major regulatory requirements and the requirements' implications." The prompt can also include definitions of particular terms, such as operative standards or controls.

In act 704, the system receives, via a user interface, an output generation request including an input for generation of an output using a large language model (LLM). The input includes a set of gaps associated with one or more scenarios failing to satisfy the one or more operative standards of the set of vector representations. Examples of gaps are discussed with reference to gaps 606 in FIG. 6. Each scenario is associated with a unique identifier and corresponding metrics indicating one or more actions in the first set of actions absent from the scenario. Examples of scenarios are discussed with reference to FIG. 6. Each gap in the set of gaps includes a set of attributes defining the scenario including the unique identifier of the scenario, the corresponding metrics of the scenario, the corresponding vector representations associated with the scenario, a title of the scenario, a summary of the scenario, and/or a severity level of the scenario.

In some implementations, the set of attributes defining the scenario includes a binary indicator of the severity level of the scenario, a category of the severity level of the scenario, and/or a probability associated with the severity level of the scenario. For instance, a binary indicator can be set to "1" for severe (indicating an issue that requires immediate attention) or "0" for non-severe (where the issue is less urgent but still requires resolution). In another example, categories can range from "Low" to "High" severity, helping prioritize remedial actions based on the potential impact and risk associated with each scenario. In a further example, a high probability value can indicate that the compliance gap is highly likely to lead to regulatory fines or data breaches if not addressed promptly.

In act 706, using the received input, the system constructs a set of prompts for each gap in the set of gaps. The set of prompts for a particular gap includes the set of attributes defining the scenario, such as scenario identifiers, severity assessments (e.g., criticality level), summaries outlining the compliance issue, the first set of actions (e.g., actionable directives or general principles of FIG. 6) of the one or more operative standards, and/or the set of vector representations. In some implementations, the set of prompts for each gap in the set of gaps includes a set of preloaded query contexts defining one or more sets of alphanumeric characters associated with the set of vector representations. The preloaded query contexts include predefined templates, rules, or configurations that specify criteria for mapping gaps to operative standards. For example, the preloaded query contexts can include definitions of terms such as operative standards and/or gaps. The prompts serve as input to an LLM, which is designed to process natural language inputs and generate structured outputs based on learned patterns and data.

In act 708, for each gap in the set of gaps, the system maps the gap to one or more operative standards of the set of vector representations. The system supplies the prompt of the particular gap into the LLM. Responsive to inputting the prompt, the system receives, from the LLM, a gap-specific set of operative standards including the one or more operative standards associated with the particular gap. In some implementations, the system can generate, for each gap-specific set of operative standards of the sets of gap-specific set of operative standards for each gap, an explanation associated with how the one or more operative standards is mapped. The output of the LLM can be in the form of alphanumeric characters. In some implementations, responsive to inputting the prompt, the system receives, from the AI model, the gap-specific set of operative standards, and the corresponding sets of vector representations.

In some implementations, the prompt into the LLM includes a directive to provide a first explanation of why a particular gap should be mapped to a particular operative standard, and also a second explanation of why a particular gap should not be mapped to a particular operative standard. The prompt can further include a directive to provide an explanation of why the first explanation or the second explanation is weighted more (e.g., why a certain mapping occurs). In some implementations, a human individual can approve or disapprove the mappings based on the first and/or second explanations. Allowing a human-in-the-loop (HITL) and generating a first and a second explanation provides transparency to users of the platform regarding the generated mappings.

In act 710, the system generates for display, at the user interface, a graphical representation indicating the gap-specific set of operative standards. The graphical representation includes a first representation of each gap in the set of gaps and a second representation of the corresponding gap-specific set of operative standards. In some implementations, each gap is visually represented to highlight its specific attributes, such as severity level, scenario identifier, and a summary detailing the gap. The graphical representations can use charts, diagrams, or visual frameworks that integrate color coding, icons, or annotations to denote severity levels, compliance progress, or overdue actions. Annotations within the graphical representation can offer additional context or explanations regarding each gap and its alignment with operative standards. Overlays can be used to indicate overdue actions, completed mappings, and/or compliance deadlines.

In act 712, using the gap-specific set of operative standards, the system generates a second set of actions for each gap in the set of gaps including one or more actions in the first set of actions indicated by the corresponding gap-specific set of operative standards. The second set of actions can modify a portion of the scenario in the corresponding gap to satisfy the one or more operative standards of the set of vector representations. For instance, actions may involve updating policies, enhancing security measures, implementing new protocols, and/or conducting training sessions to improve organizational practices and mitigate risks. Each action can be linked directly to the corresponding gap and its associated operative standards.

In some implementations, the set of prompts is a first set of prompts, and the gap-specific set of operative standards is a first set of operative standards. Using the received input, the system constructs a second set of prompts for each gap in the set of gaps. The second set of prompts for a particular gap includes the set of attributes defining the scenario and the set of vector representations. Using the second set of prompts, the system receives, from the LLM, a second set of operative standards for each gap in the set of gaps. Using the second set of operative standards, the system constructs a third set of prompts for each gap in the set of gaps. The third set of prompts for the particular gap includes the set of attributes defining the scenario and the first set of actions of the one or more operative standards. Using the third set of prompts, the system receives, from the LLM, a third set of operative standards for each gap in the set of gaps. The iterative approach of using multiple sets of prompts with the LLM enhances the system's capability to adapt and respond dynamically to previously generated mappings and thus contributes to a continuous improvement process whereby insights gained from each interaction cycle contribute to more refined strategies for achieving alignment of an organization with the operative standards.

In some implementations, the set of prompts is a first set of prompts. For each vector representation in the received set of vector representations, the system identifies a set of textual content representative of the set of vector representations. The system partitions the set of textual content into a plurality of text subsets of the set of textual content based on predetermined criteria. The predetermined criteria can include a length of each text subset and/or a complexity of each text subset. For example, the predetermined criteria can be token count or character limit to ensure uniformity and coherence in the division process. Chunking the textual content breaks down a large amount of textual content into manageable units. For token-based partitioning, the system calculates the number of linguistic units, or tokens, within the textual content. These tokens, in some implementations, encompass individual words, phrases, or even characters, depending on the specific linguistic analysis employed. The predetermined token count criterion sets a quantitative guideline, dictating the number of linguistic units encompassed within each chunk. In some implementations, when employing a character limit criterion, the system focuses on the total number of characters within the textual content character limit criterion, which, in some implementations, involves assessing both alphanumeric characters and spaces. The predetermined character limit establishes an upper threshold, guiding the system to create segments that adhere to the predefined character limit.

The system can receive user feedback related to deviations between the gap-specific set of operative standards and a desired set of operative standards. The system can iteratively adjust the sets of prompts to modify the gap-specific set of operative standards to the desired set of operative standards. The system can generate action plans, update compliance strategies, and/or refine operational practices to enhance alignment with the set of vector representations. The system can generate a set of actions (e.g., a modification plan) that adjust the current attributes of the scenario to a desired set of attributes of the scenario. The system can identify the root cause of the difference between the attributes of the scenario and the desired set of attributes of the scenario. For example, the desired set of attributes of the scenario can include a certain action not found in the current attributes of the scenario (e.g., an anonymization procedure). The actions (e.g., the anonymization procedure) can be preloaded into the system.

Generating Actionable Items from Guidelines Using the Data Generation Platform

Figure 8:
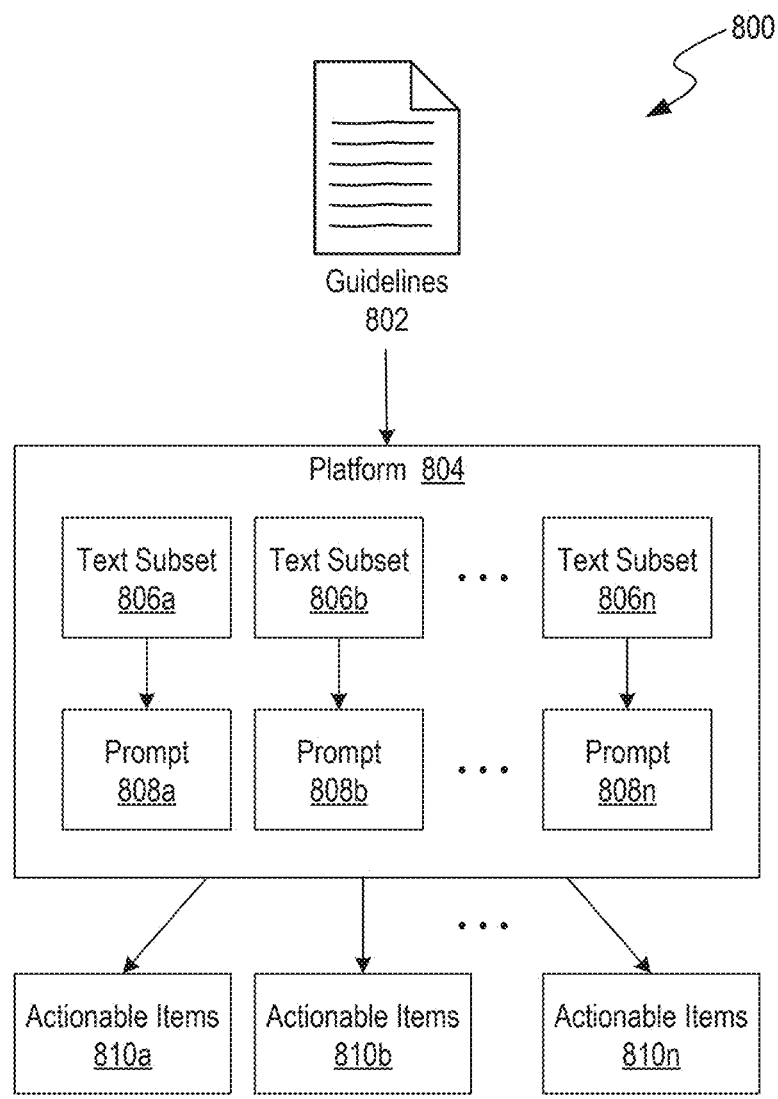
FIG. 8 is an illustrative diagram illustrating an example environment of the platform identifying actionable items from guidelines.

FIG. 8 is an illustrative diagram illustrating an example environment 800 of the platform identifying actionable items from guidelines, in accordance with some implementations of the present technology. Example environment 800 includes guidelines 802, platform 804, text subsets 806a-806n, prompts 808a-808n, and actionable items 810a-810n. Guidelines 802 are the same as or similar to guidelines 602 discussed with reference to FIG. 6. Platform 804 is the same as or similar to platform 504 discussed with reference to FIG. 5. Implementations of example environment 800 can include different and/or additional components or can be connected in different ways.

Platform 804 can be a web-based application that hosts various use cases, such as compliance, that allows users to interact via a front-end interface. Inputs to the platform 804 can be guidelines 802 in various formats (e.g., text, Excel). Further examples of platform 804 are discussed with reference to platform 504 in FIG. 5. The backend of platform 804 can chunk (e.g., partition) the guidelines into text subsets 806a-806n and vectorize the text subsets 806a-806n. The vectorized representations of the text subsets 806a-806n can be stored in a database accessible by the platform 804. The platform 804 can use an API call to send prompts to an AI model (such as an LLM), as described further in FIG. 5. The AI model processes the prompts and returns the output of actionable items to the backend of platform 804, which can format the output into a user-friendly structure.

Text subsets 806a-806n refer to portions of the guidelines 802 that have been extracted or divided (e.g., based on specific criteria) into smaller segments. Each of the text subsets 806a-806n can be categorized by topic, section, or other relevant factors. By breaking down large volumes of text into subsets, the platform can focus on specific parts of the guidelines. The structured approach additionally allows the platform to handle large volumes of regulatory text efficiently.

Prompts 808a-808n are specific queries or instructions generated from the text subsets 806a-806n that are formulated to direct the behavior and output of an AI model, such as identifying actionable items from the text subsets 806a-806n of guidelines 802. For example, for text subset 806a, a corresponding prompt 808a is constructed. In some implementations, a prompt can include multiple text subsets. In some implementations, a single text subset can be associated with multiple prompts. Prompts 808a-808n cause the AI model to identify particular attributes of the text subsets 806a-806n, such as regulatory obligations or compliance requirements to dynamically generate meaningful outputs (e.g., actionable items). In some implementations, the prompts 808a-808n can be generated using a second AI model. The second AI model can analyze the text subsets 806a-806n or the guidelines 802 directly to identify features of the text subset such as context, entities, and the relationships between the features by, for example, breaking down the input into smaller components and/or tagging predefined keywords. The second AI model can construct prompts that are contextually relevant using the identified features. For instance, if the input pertains to compliance guidelines, the second AI model can identify sections within the guidelines and frame prompts that highlight the most relevant information (e.g., information directed toward compliance guidelines). The prompts can include specific questions or statements that direct the first AI model to focus on particular aspects, such as "What are the key compliance requirements for data protection in this guideline?"

The second AI model can, in some implementations, employ query expansion. Query expansion is a process that enhances the original query by including synonyms, related concepts, and/or additional contextually relevant terms to improve the comprehensiveness of the response. For example, if the initial prompt is "Identify key actionable items for data protection," the second AI model can expand the query by including keywords such as "privacy regulations," "data security measures," and "information governance." In some implementations, the second AI model can reference domain-specific thesauruses and/or pre-trained word embeddings to find synonyms and terms related to the identified elements.

Prompts 808a-808n can include definitions, keywords, and instructions that guide the AI model in identifying relevant actionable items. For instance, definitions can clarify what constitutes an "actionable item" or "obligation." Further, prompts 808a-808n can specify keywords such as "must," "shall," or "required." The keywords may indicate mandatory actions or prohibitions that need to be identified as actionable items. For example, a prompt can instruct the AI model to flag any sentence containing the word "must" as it likely denotes a regulatory requirement. In another example, prompts 808a-808n can direct the AI model to extract all instances of deadlines for compliance actions, descriptions of required documentation, or procedures for reporting to regulatory bodies. Instructions can also include formatting guidelines, ensuring that the extracted actionable items are presented in a consistent and usable format.

Actionable items 810a-810n (e.g., directives, actions) are the specific tasks or requirements identified by the AI model from the guidelines, based on the analysis of text subsets 806a-806n and prompts 808a-808n. In some implementations, rather than being mere excerpts from the text subsets 806a-806n, actionable items 810a-810n can be distilled, comprehensive instructions that define specific measures or procedures to implement. For instance, an actionable item might outline the frequency and format of compliance reports required, specify the data to be included, and designate the department responsible for submission. Actionable items 810a-810n are designed to translate regulatory text into actionable steps that organizations can directly operationalize. Actionable items 810a-810n can include tasks such as reporting, record-keeping, compliance checks, and other regulatory actions.

Each actionable item can include metadata such as the responsible party within the organization, the type of customer or stakeholder affected, and/or other relevant identifiers. An AI model can use natural language processing (NLP) algorithms to parse through text subsets 806a-806n to identify relevant phrases, keywords, and semantic structures (e.g., as instructed by the prompts 808a-808n) that indicate actionable items 810a-810n within the guidelines 802. Prompts 808a-808n can direct the AI model by providing contextual cues and specific queries that direct the AI model to focus on particular guidelines or aspects of guidelines within the guidelines 802.

Example Implementations of a Validation Engine of the Data Generation Platform

Figure 9:
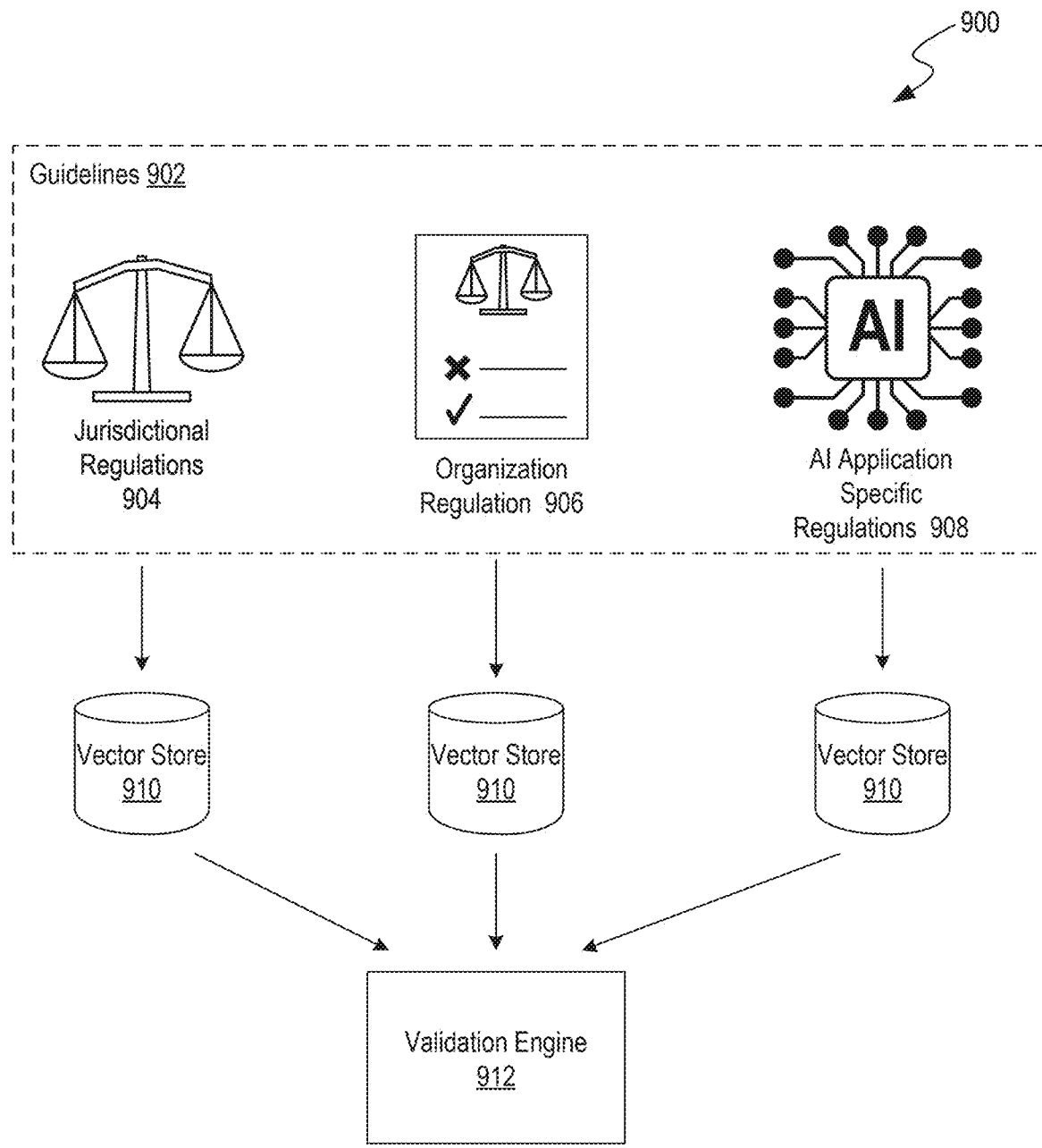
FIG. 9 is a block diagram illustrating an example environment for using the guidelines input into the validation engine for determining AI compliance.

FIG. 9 is a block diagram illustrating an example environment 900 for using the guidelines input into the validation engine for determining AI compliance, in accordance with some implementations of the present technology. Example environment 900 includes guidelines 902 (e.g., jurisdictional regulations 904, organizational regulations 906, AI application-specific regulations 908), vector store(s) 910, and validation engine 912. Validation engine 912 can be the same as or similar to generative model engine 120 in data generation platform 102 discussed with reference to FIG. 1. Vector stores 910 and validation engine 912 are implemented using components of example devices 200 and client computing devices 302 illustrated and described in more detail with reference to FIG. 2 and FIG. 3, respectively. Likewise, implementations of example environment 900 can include different and/or additional components or can be connected in different ways.

Guidelines 902 can include various elements such as jurisdictional regulations 904, organizational regulations 906, and AI application-specific regulations 908 (e.g., unsupervised learning, natural language processing (NLP), generative AI). Jurisdictional regulations 904 (e.g., governmental regulations) can include regulations gathered from authoritative sources such as government websites, legislative bodies, and regulatory agencies. Jurisdictional regulations 904 can be published in legal documents or official publications and cover aspects related to the development, deployment, and use of AI technologies within specific jurisdictions. Organizational regulations 906 include internal policies, procedures, and guidelines established by organizations to govern AI-related activities within the organization's operations. Organizational regulations 906 can be developed in alignment with industry standards, legal requirements, and organizational objectives. AI application-specific regulations 908 include regulations that pertain to specific types of AI applications, such as unsupervised learning, NLP, and generative AI. Each type of AI application presents unique challenges and considerations in terms of compliance, ethical use, and/or regulatory adherence. For example, unsupervised learning algorithms, whereby the model learns from input data without labeled responses, may be subject to regulations that prevent bias and discrimination in unsupervised learning models. NLP technologies, which enable computers to understand, interpret, and generate human language, may be subject to specific regulations aimed at safeguarding user privacy. Generative AI, which autonomously creates new content, may focus on intellectual property rights, content moderation, and ethical use cases. AI developers may need to incorporate additional mechanisms for copyright protection, content filtering, and/or user consent management to comply with regulations related to generative AI technologies.

The guidelines 902 are stored in vector stores 910. The vector stores 910 store the guidelines 902 in a structured and accessible format (e.g., using distributed databases or NoSQL stores), which allows for efficient retrieval and utilization by the validation engine 912. In some implementations, the guidelines 902 are preprocessed to remove any irrelevant information, standardize the format, and/or organize the guidelines 902 into a structured database schema. Once the guidelines 902 are prepared, the guidelines 902 can be stored in vector stores 910 using distributed databases or NoSQL stores.

To store the guidelines 902 in the vector stores 910, the guidelines 902 can be encoded into vector representations for subsequent retrieval by the validation engine 912. The textual data of the guidelines 902 are transformed into numerical vectors that capture the semantic meaning and relationships between words or phrases in the guidelines 902. For example, the text is encoded into vectors using word embeddings and/or TF-IDF (Term Frequency-Inverse Document Frequency) encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF encoding calculates the importance of a word in a guideline relative to the word's frequency in the entire corpus of guidelines 902. For example, the system can assign higher weights to words that are more unique to a specific document and less common across the entire corpus.

In some implementations, the guidelines 902 are stored using graph databases such as Neo4j™ or Amazon Neptune™. Graph databases represent data as nodes and edges, allowing for the modeling of relationships between guidelines 902 to demonstrate the interdependencies. In some implementations, the guidelines 902 are stored in a distributed file system such as Apache Hadoop™ or Google Cloud Storage™. These systems offer scalable storage for large volumes of data and support parallel processing and distributed computing. Guidelines 902 stored in a distributed file system can be accessed and processed by multiple nodes simultaneously, which allows for faster retrieval and analysis by the validation engine.

The vector stores 910 can be stored in a cloud environment hosted by a cloud provider, or in a self-hosted environment. In a cloud environment, the vector stores 910 have the scalability of cloud services provided by platforms (e.g., AWS™, Azure™). Storing the vector stores 910 in a cloud environment entails selecting the cloud service, provisioning resources dynamically through the provider's interface or APIs, and configuring networking components for secure communication. Cloud environments allow the vector stores 910 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector stores 910 are stored on a private web server. Deploying the vector stores 910 in a self-hosted environment entails setting up the server with the necessary hardware or virtual machines, installing an operating system, and storing the vector stores 910. In a self-hosted environment, organizations have full control over the vector stores 910, allowing organizations to implement customized security measures and compliance policies tailored to the organization's specific needs. For example, organizations in industries with strict data privacy and security regulations, such as financial institutions, can mitigate security risks by storing the vector stores 910 in a self-hosted environment.

The validation engine 912 accesses the guidelines 902 from the vector stores 910 to initiate the compliance assessment. The validation engine 912 can establish a connection to each vector store 910 using appropriate APIs or database drivers. The connection allows the validation engine 912 to query the vector store 910 and retrieve the relevant guidelines for the AI application under evaluation. Frequently accessed guidelines 902 are stored in memory, which allows the validation engine 912 to reduce latency and improve response times for compliance assessment tasks. In some implementations, only the relevant guidelines are retrieved based on the specific AI application under evaluation. For example, metadata tags, categories, or keywords associated with the AI application can be used to filter the guidelines 902.

The validation engine 912 evaluates the AI application's compliance with the retrieved guidelines 902 (e.g., using semantic search, pattern recognition, and machine learning techniques). For example, the validation engine 912 compares the vector representations of the different explanations and outcomes by calculating the cosine of the angle between the two vectors indicating the vectors' directional similarity. Similarly, for comparing explanations, the validation engine 912 can measure the intersection over the union of the sets of words in the expected and case-specific explanations.

Figure 10:
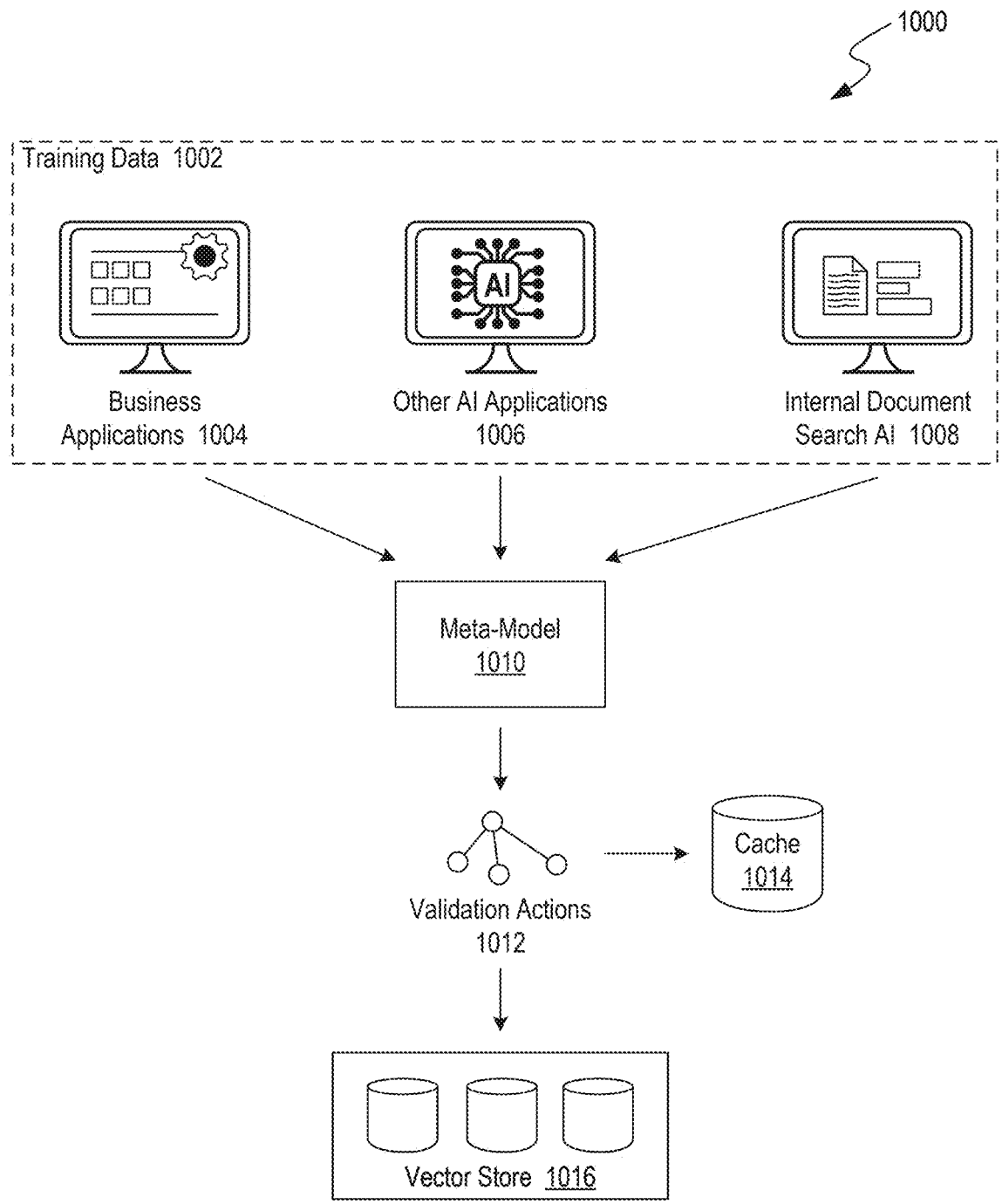
FIG. 10 is a block diagram illustrating an example environment for generating validation actions to determine AI model compliance.

FIG. 10 is a block diagram illustrating an example environment 1000 for generating validation actions to determine AI model compliance, in accordance with some implementations of the present technology. Example environment 1000 includes training data 1002, meta-model 1010, validation actions 1012, cache 1014, and vector store 1016. Meta-model 1010 is the same as or similar to machine learning model 402 illustrated and described in more detail with reference to FIG. 4. Meta-model 1010 is implemented using components of example devices 200 and client computing devices 302 illustrated and described in more detail with reference to FIG. 2 and FIG. 3, respectively. Likewise, implementations of example environment 1000 can include different and/or additional components or can be connected in different ways.

The training data 1002 includes data from sources such as business applications 1004, other AI applications 1006, and/or an internal document search AI 1008. Business applications 1004 refer to software tools or systems used to facilitate various aspects of business operations and can include data related to, for example, loan transaction history, customer financial profiles, credit scores, and income verification documents. For example, data from a banking application can provide insights into an applicant's banking behavior, such as average account balance, transaction frequency, and bill payment history. Other AI applications 1006 can include, for example, credit scoring models, fraud detection algorithms, and risk assessment systems that can be used by lenders to evaluate loan applications. Data from other AI applications 1006 refer to various software systems that utilize AI techniques to perform specific tasks or functions. The data can include credit risk scores and fraud risk indicators. For example, an AI-powered credit scoring model can provide a risk assessment score based on an applicant's credit history, debt-to-income ratio, and other financial factors. The internal document search AI 1008 is an AI system tailored for searching and retrieving information from internal documents within an organization. For example, the internal document search AI 1008 can be used to retrieve and analyze relevant documents such as loan agreements, regulatory compliance documents, and internal policies. Data from internal documents can include, for example, legal disclosures, loan terms and conditions, and compliance guidelines. For example, the AI system can flag loan applications that contain discrepancies or inconsistencies with regulatory guidelines or internal policies.

The training data 1002 is fed into the meta-model 1010 to train the meta-model 1010, enabling the meta-model 1010 to learn patterns and characteristics associated with compliant and non-compliant AI behavior. AI and training methods are discussed further in reference to FIG. 7. The meta-model 1010 leverages the learned patterns and characteristics to generate validation actions 1012, which serve as potential use cases designed to evaluate AI model compliance. The validation actions 1012 can encompass various scenarios and use cases relevant to the specific application domain of the AI model under assessment. Further methods of creating validation actions are discussed in reference to FIGS. 12-14.

In some implementations, the generated validation actions 1012 can be stored in a cache 1014 and/or a vector store 1016. The cache 1014 is a temporary storage mechanism for storing recently accessed or frequently used validation actions, and facilitates efficient retrieval when needed. On the other hand, the vector store 1016 provides a structured repository for storing vector representations of validation actions, enabling efficient storage and retrieval based on similarity or other criteria. The vector store 1016 stores the generated validation actions 1012 in a structured and accessible format (e.g., using distributed databases or NoSQL stores), which allows for efficient retrieval and utilization by the meta-model 1010. The generated validation actions 1012 can be preprocessed to remove any irrelevant information, standardize the format, and/or organize the generated validation actions 1012 into a structured database schema. Once the generated validation actions 1012 are prepared, the generated validation actions 1012 can be stored in a vector store 1016 using distributed databases or NoSQL stores.

In some implementations, the generated validation actions 1012 are stored using graph databases such as Neo4j™ or Amazon Neptune™. Graph databases represent data as nodes and edges, allowing for the modeling of relationships between generated validation actions 1012 to demonstrate the interdependencies. In some implementations, the generated validation actions 1012 are stored in a distributed file system such as Apache Hadoop™ or Google Cloud Storage™. The systems offer scalable storage for large volumes of data and support parallel processing and distributed computing. Generated validation actions 1012 stored in a distributed file system can be accessed and processed by multiple nodes simultaneously, which allows for faster retrieval and analysis by the meta-model 1010.

The vector store 1016 can be stored in a cloud environment hosted by a cloud provider, or in a self-hosted environment. In a cloud environment, the vector store 1016 has the scalability of cloud services provided by platforms (e.g., AWS™, Azure™). Storing the vector store 1016 in a cloud environment entails selecting the cloud service, provisioning resources dynamically through the provider's interface or APIs, and configuring networking components for secure communication. Cloud environments allow the vector store 1016 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 1016 is stored on a private web server. Deploying the vector store 1016 in a self-hosted environment entails setting up the server with the necessary hardware or virtual machines, installing an operating system, and storing the vector store 1016. In a self-hosted environment, organizations have full control over the vector store 1016, allowing organizations to implement customized security measures and compliance policies tailored to the organization's specific needs. For example, organizations in industries with strict data privacy and security regulations, such as financial institutions, can mitigate security risks by storing the vector store 1016 in a self-hosted environment.

The meta-model 1010 accesses the generated validation actions 1012 from the vector store 1016 to initiate the compliance assessment. The system can establish a connection to the vector store 1016 using appropriate APIs or database drivers. The connection allows the meta-model 1010 to query the vector store 1016 and retrieve the relevant vector constraints for the AI application under evaluation. Frequently accessed validation actions 1012 are stored in memory, which allows the system to reduce latency and improve response times for compliance assessment tasks.

In some implementations, only the relevant validation actions 1012 are retrieved based on the specific AI application under evaluation. For example, metadata tags, categories, or keywords associated with the AI application can be used to filter the validation actions 1012. The relevant validation actions 1012 can be specifically selected based on the specific context and requirements of the AI application being evaluated. For example, the system analyzes metadata tags, keywords, or categories associated with the validation actions 1012 stored in the system's database. Using the specific context and requirements of the AI application, the system filters and retrieves the relevant validation actions from the database.

Various filters can be used to select relevant validation actions. In some implementations, the system uses natural language processing (NLP) to parse through the text of the validation actions 1012 and identify key terms, phrases, and clauses that denote regulatory obligations relevant to the AI application's domain. The specific terms related to the AI application's domain can be predefined and include, for example, "patient privacy" for healthcare sector applications. Using the specific terms related to the AI application's domain as a filter, the system can filter out the non-relevant validation actions. To identify the relevant validation actions from the validation actions 1012, the system can determine the specific terms to use as filters by calculating the similarity between vectors representing domain-specific terms (e.g., "healthcare") and vectors representing other terms related to the domain (e.g., "patient privacy"). Domain-specific terms can be identified based on the proximity of the other terms to known terms of interest. A similarity threshold can be applied to filter out terms that are not sufficiently similar to known domain-specific terms.

In some implementations, the system can tag relevant validation actions with attributes that help contextualize the relevant validation actions 1012. The tags serve as markers that categorize and organize the validation actions 1012 based on predefined criteria, such as regulatory topics (e.g., data privacy, fairness, transparency) or jurisdictional relevance (e.g., regional regulations, industry standards). The tags provide a structured representation of the validation actions 1012 and allow for easier retrieval, manipulation, and analysis of regulatory content. The tags and associated metadata can be stored in a structured format, such as a database, where each validation action 1012 is linked to the corresponding tags and/or regulatory provisions of that validation action 1012.

The meta-model 1010 evaluates the AI application's compliance with the vector constraints through the use of validation actions 1012 (e.g., using semantic search, pattern recognition, and machine learning techniques). Further evaluation methods in determining compliance of AI applications are discussed with reference to FIGS. 12-14.

Figure 11:
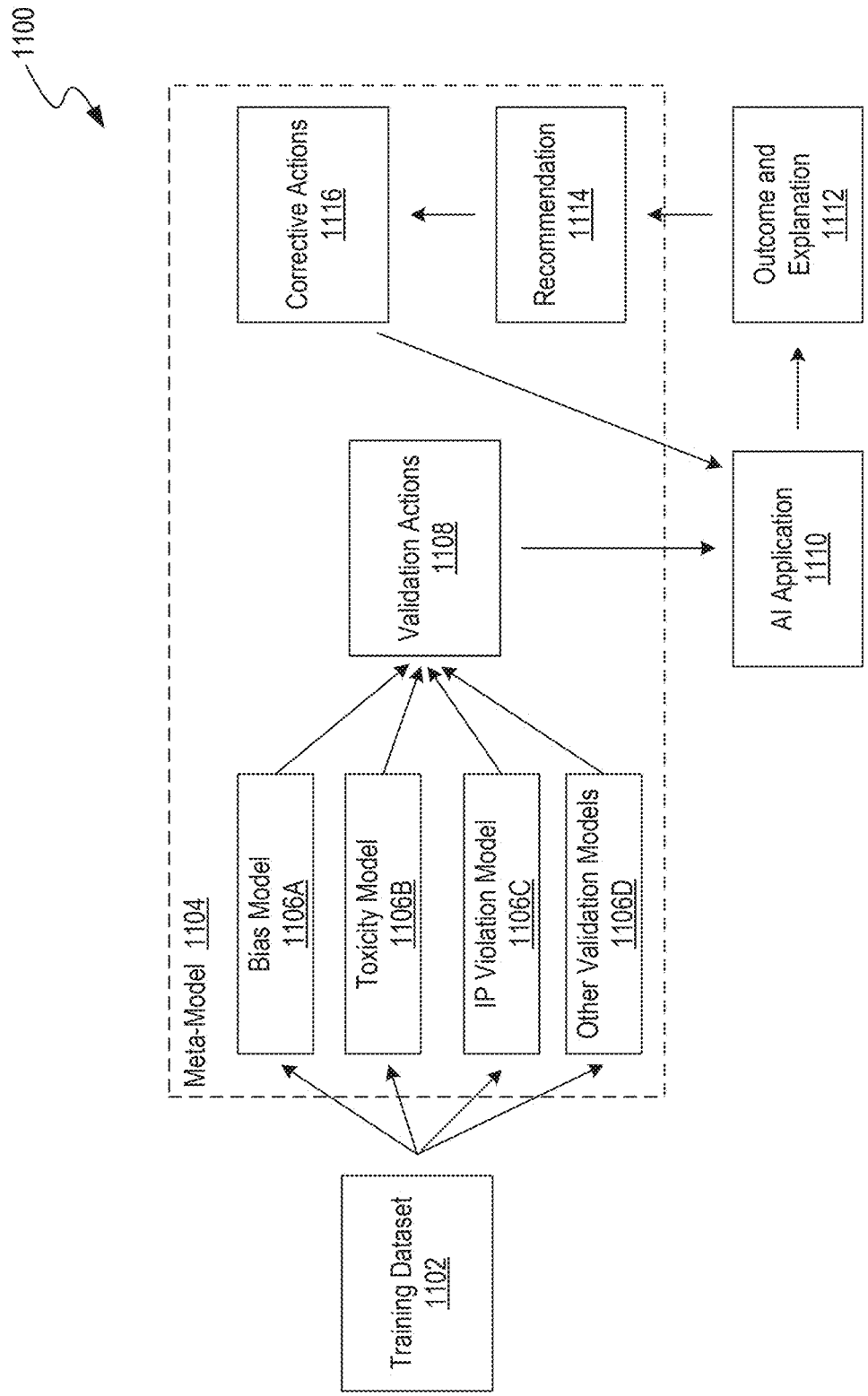
FIG. 11 is a block diagram illustrating an example environment for automatically implementing corrective actions on the AI model.

FIG. 11 is a block diagram illustrating an example environment 1100 for automatically implementing corrective actions on the AI model, in accordance with some implementations of the present technology. Example environment 1100 includes training dataset 1102, meta-model 1104 (which includes validation models 1106A-1106D, validation actions 1108, AI application 1110), outcome and explanation 1112, recommendation 1114, and corrective actions 1116. Meta-model 1104 is the same as or similar to meta-model 1010 illustrated and described in more detail with reference to FIG. 10. Meta-model 1104 and AI application 1110 are implemented using components of example devices 200 and client computing devices 302 illustrated and described in more detail with reference to FIG. 2 and FIG. 3, respectively. Likewise, implementations of example environment 1100 can include different and/or additional components or can be connected in different ways.

The training dataset 1102, which includes a collection of data used to train machine learning models, is input into the meta-model 1104. The meta-model 1104 is a comprehensive model that encompasses multiple sub-models tailored to address specific aspects of AI compliance. Within the meta-model 1104, various specialized models are included, such as a bias model, a toxicity model 1106B, an IP violation model 1106C, and other validation models 1106D. Each of the models is responsible for detecting and assessing specific types of non-compliant content within AI models. Upon processing the training dataset 1102, each model generates validation actions tailored to evaluate the presence or absence of specific types of non-compliant content. Further evaluation techniques in generating validation actions using the meta-model 1104 are discussed with reference to FIGS. 12-14.

The set of generated validation actions 1108 is provided as input to an AI application 1110 in the form of a prompt. The AI application 1110 processes the validation actions 1108 and produces an outcome along with an explanation 1112 detailing how the outcome was determined. Subsequently, based on the outcome and explanation 1112 provided by the AI application 1110, the system can generate recommendations 1114 for corrective actions. The recommendations are derived from the analysis of the validation action outcomes and aim to address any identified issues or deficiencies. For example, if certain validation actions fail to meet the desired criteria due to specific attribute values or patterns, the recommendations can suggest adjustments to those attributes or modifications to the underlying processes.

For a bias detection model, if certain attributes exhibit unexpected associations or distributions, the system can retrain the tested AI model with revised weighting schemes to better align with the desired vector constraints. In a toxicity model, the corrective actions can include implementing post-processing techniques in the tested AI model to filter out responses that violate the vector constraints (e.g., filtering out responses that include the identified vector representations of the alphanumeric characters). Similarly, in an IP rights violation model, such as the ML model discussed in reference to FIG. 7, the corrective actions can include implementing post-processing techniques in the tested AI model to filter out responses that violate the IP rights (e.g., filtering out responses including the predetermined alphanumeric characters).

In some implementations, based on the outcomes and explanations, the system applies predefined rules or logic to determine appropriate corrective actions. The rules can be established by users and can consider factors such as regulatory compliance, risk assessment, and business objectives. For example, if an application is rejected due to insufficient income, the system can recommend requesting additional financial documentation from the applicant.

In some implementations, the system can use machine learning models to generate recommendations. The models learn from historical data and past decisions to identify patterns and trends that indicate a set of actions the AI model can take to comply with the vector constraints. By training on a dataset of past corrective actions and the outcomes, the machine learning models can predict the most effective recommendations for new cases. AI and training methods are discussed further in reference to FIG. 7. The recommendations 1114 can be automatically implemented as corrective actions 1116 by the system. The automated approach streamlines the process of addressing identified issues and ensures swift remediation of non-compliant content within AI models, enhancing overall compliance and reliability.

Validating Autonomous Agents Using the Data Generation Platform

Figure 12A:
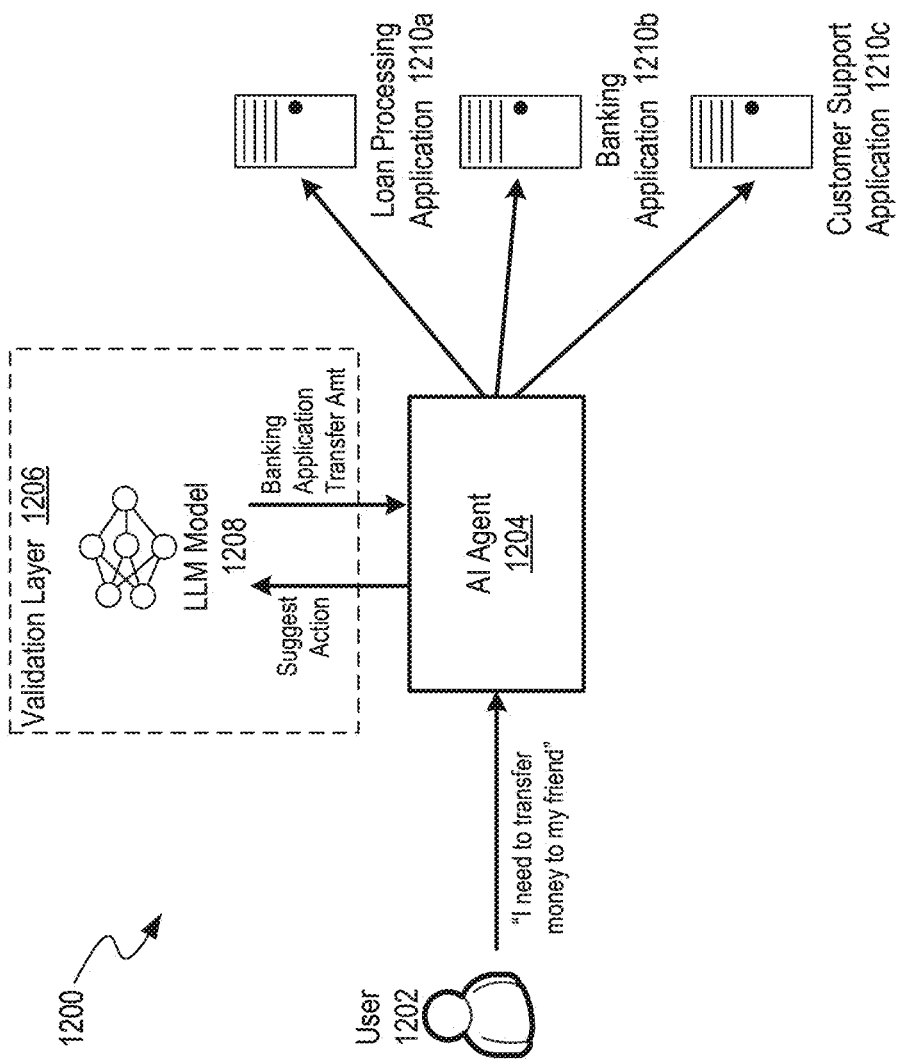
FIG. 12A is a block diagram illustrating an example environment for validating an autonomous agent.
Figure 12B:
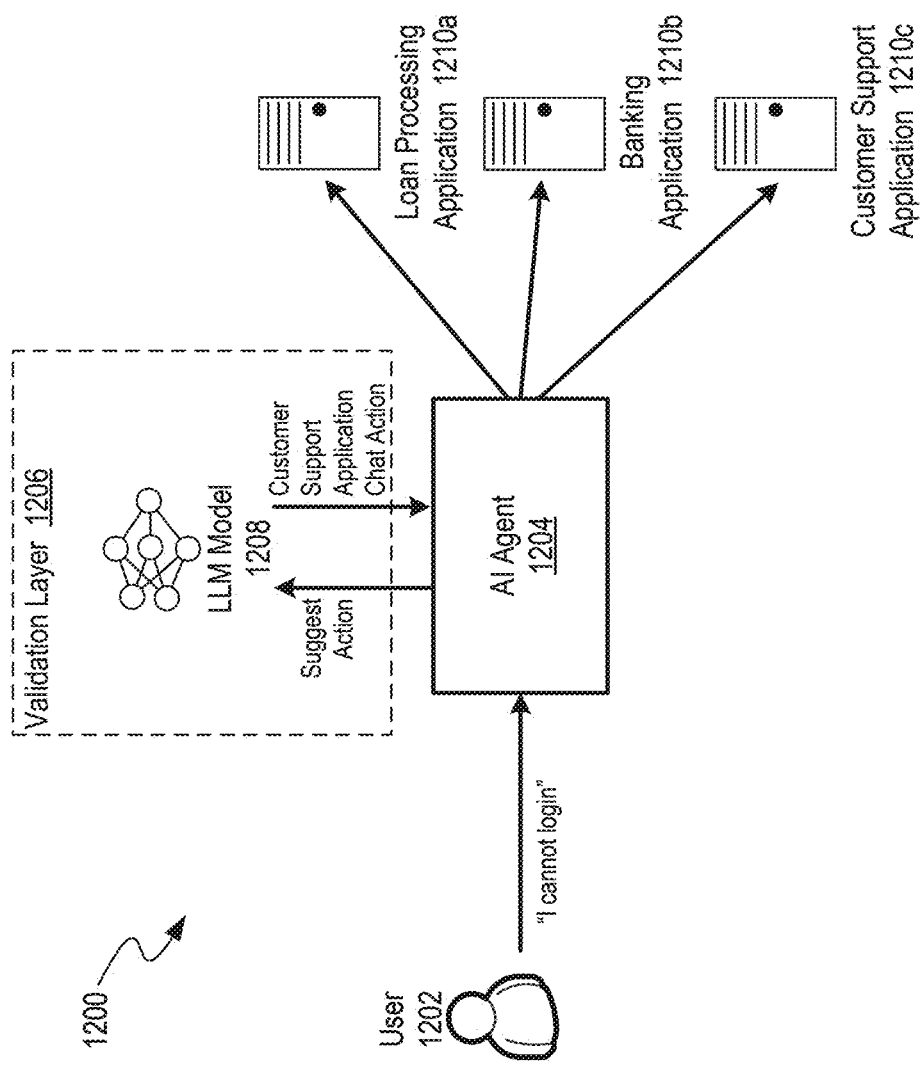
FIG. 12B is a block diagram illustrating another example environment for validating the autonomous agent.

FIGS. 12A and 12B are block diagrams illustrating an example environment 1200 for validating an autonomous agent 1204. The example environment 1200 includes a user 1202, the agent 1204, a validation layer 1206, a model 1208, and applications 1210 (e.g., loan processing application 1210a, banking application 1210b, customer support application 1210c, and so forth). The validation layer 1206 is the same as or similar to validation engine 912, illustrated and described in more detail with reference to FIG. 9. The validation layer 1206 and the agent 1204 can be implemented using components of example devices 200 and client computing devices 302 illustrated and described in more detail with reference to FIG. 2 and FIG. 3, respectively. Implementations of example environment 1200 can include different and/or additional components or can be connected in different ways.

For example, in FIG. 12A, the user 1202 can input a prompt or query to the agent 1204 such as "I need to transfer money to my friend." The user 1202 refers to an individual or entity interacting with the system by providing input or queries to the agent 1204. The user 1202 can be a customer, an employee, or any stakeholder using the system to perform specific autonomous tasks or provide information. In some implementations, the user 1202 can be represented by a software application or another automated system that interacts with the agent 1204 through predefined protocols. The input (e.g., queries, prompts, commands) may be in natural language form and typically expresses a request or instruction for the agent to perform some action or provide some information.

The agent 1204 generates (e.g., proposes, suggests, creates, etc.) a set of actions. The agent 1204 is an autonomous (or semi-autonomous) software and/or hardware entity that processes the user's input and generates a set of proposed actions to fulfill the user's request. In some implementations, the agent 1204 is AI-based and uses outputs from AI models (e.g., LLMs) and predefined objectives to autonomously generate the proposed actions. The actions can be intended to fulfill specific tasks or requests made by the user, as well as other tasks or requests that are related to or associated with requests made by the user. In some implementations, proposed actions can include a variety of tasks such as data retrieval, transaction processing, system configuration changes, process optimization, image analysis, video analysis, scheduling and/or task management, content generation, sentiment analysis, automated testing, quality assurance, knowledge management, supply chain optimization, workflow automation, and so forth. Predefined objectives are the specific goals or targets that the agent 1204 aims to achieve when generating proposed actions. The objectives can be set when constructing the agent model or defined by the user through input parameters. In some implementations, predefined objectives are encoded within the architecture of the agent 1204. For example, when the agent adopts a neural network architecture, these objectives can weigh the activations of neurons within the network to influence the decision-making process. Certain neurons can be activated to prioritize actions that ensure compliance with specific guidelines or align with specific user preferences.

The agent 1204 can include a series of modules such as a natural language processing (NLP) module to interpret user inputs, a decision-making engine to determine the appropriate actions, and/or an execution module to carry out the actions on hardware or software assets. The agent 1204 can have access to various databases (e.g., knowledge bases) and APIs to retrieve particular information (e.g., domain-specific information, historical data, user preferences, and so forth). Additionally, the agent 1204 can operate in different modes, such as fully autonomous, semi-autonomous with human oversight, or in collaboration with other agents. In fully autonomous mode, the agent 1204 can make decisions and execute actions without human intervention, relying entirely on the agent's 1204 programming and/or learned behaviors. Semi-autonomous mode incorporates human oversight, allowing for manual review or approval of certain actions (e.g., in high-stakes or sensitive scenarios). The collaborative mode enables the agent 1204 to work in conjunction with other agents (i.e., different agents specializing in different tasks or domains to achieve more complex objectives). For example, the agent 1204 can be a specialized AI model designed for specific tasks, such as a virtual assistant, a chatbot, or an automation bot.

The validation layer 1206 can include one or more models 1208 (e.g., AI models, LLMs, and so forth) that validate the proposed actions and modify the proposed actions when the actions fail to satisfy one or more criteria from a set of guidelines. The validation layer 1206 can determine whether the actions fail to satisfy one or more criteria from a set of guidelines using one or more methods discussed with reference to FIGS. 5-11 (e.g., comparing actionable items 810a-810n of the guidelines with the proposed actions, identifying corrective actions 1116 using the validation actions 1108 on the agent 1204 and/or its proposed actions. The validation layer 1206 can ensure that these actions comply with predefined guidelines, regulations, and operational constraints using methods discussed with reference to FIG. 15. The validation layer 1206 can modify the proposed actions if the proposed actions fail to meet the required criteria using methods discussed with reference to FIG. 15. In some implementations, the validation layer 1206 can include multiple sub-layers, each responsible for different aspects of validation, such as security checks, compliance verification, and performance. In some implementations, the models 1208 can include machine learning models, rule-based systems, and/or heuristic algorithms.

For example, in response to the query "I need to transfer money to my friend," the agent 1204 can propose the action of communicating with an API of the banking application 1210b to prompt the user 1202 for a transaction amount, verifying the recipient's account details, checking the user's account balance to ensure sufficient funds, and so forth. However, if the agent 1204 proposes actions that fail to pass the validation layer 1206, such as a proposed action transferring an amount that exceeds the user's daily transfer limit, the validation layer 1206 can identify this action as non-compliant with the predefined guidelines and prevent its execution. The applications 1210 refer to the various software systems that the agent 1204 interacts with to perform the proposed actions. The applications 1210 can include cloud-based services, on-premises software, or a combination of both.

In FIG. 12B, the user 1202 can input a prompt or query to the agent 1204 such as "I cannot login." Similarly to FIG. 12A, the agent 1204 proposes a set of actions. The validation layer 1206 validates the proposed actions and modifies the proposed actions if the actions fail to satisfy one or more criteria from a set of guidelines. For example, in response to the query "I cannot login," the agent 1204 can propose the action of communicating with an API of the customer support application 1210c to prompt the user 1202 to enter a query-and-response session with, for example, a chatbot or other customer service representative. If the agent 1204 were to mistakenly propose an action involving the banking application 1210b instead of the customer support application 1210c, the validation layer 1206 can intervene. By identifying this mismatch between the user's need (login assistance) and the proposed action (accessing banking services), the validation layer 1206 can prevent the execution of an inappropriate or potentially risky action.

Figure 13:
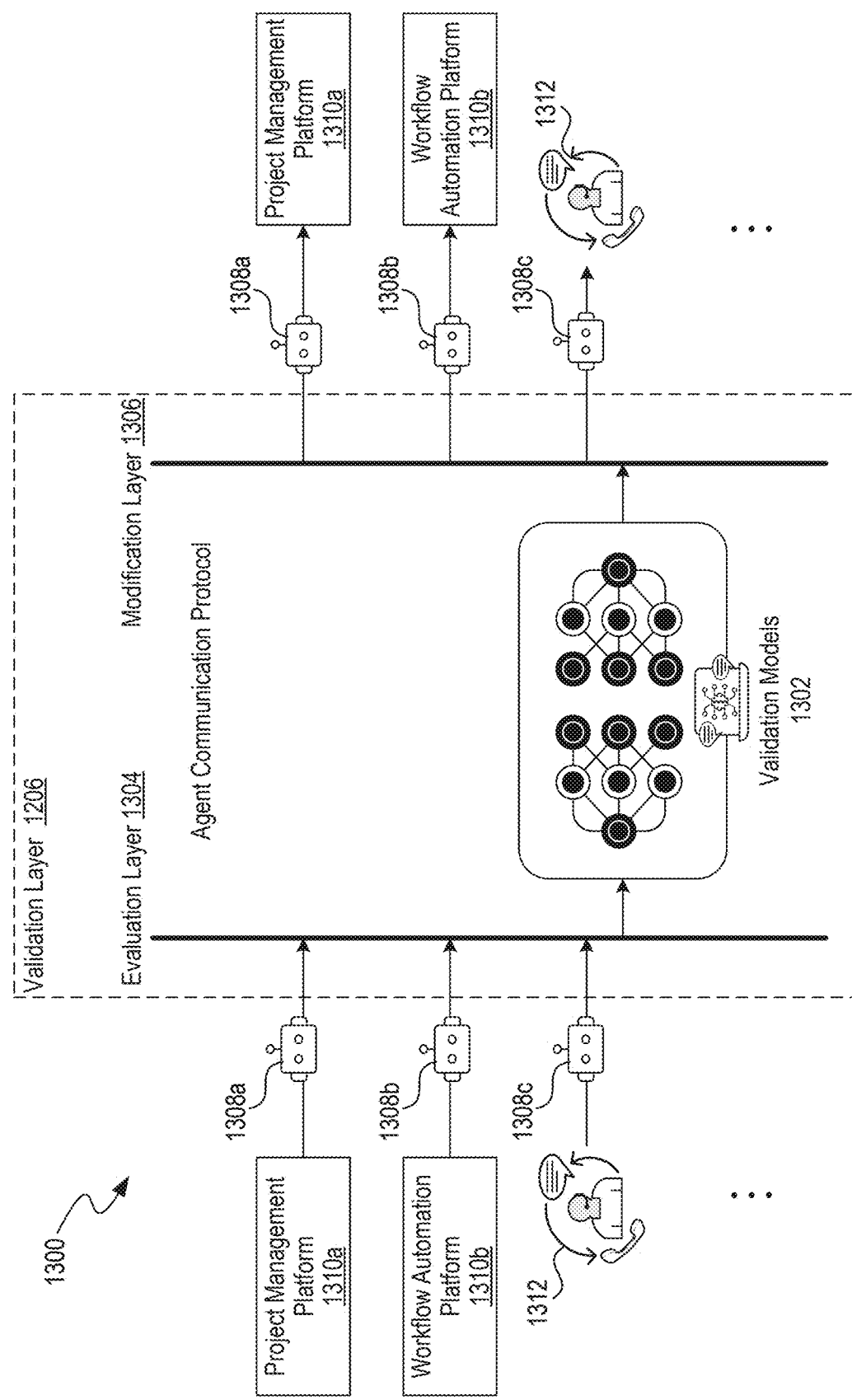
FIG. 13 is a block diagram illustrating an example environment for validating a series of autonomous agents.

FIG. 13 is a block diagram illustrating an example environment 1300 for validating a series of autonomous agents. The example environment 1300 includes the validation layer 1206 containing validation models 1302, evaluation layer 1304, and modification layer 1306. The example environment 1300 further includes agents 1308 (e.g., a first agent 1308a, a second agent 1308b, a third agent 1308c, and so forth), applications 1310 (e.g., project management platform 1310a, workflow automation platform 1310b), and user interaction 1312. The agents 1308 are the same as or similar to agent 1204, illustrated and described in more detail with reference to FIGS. 12A and 12B. The applications 1310 are the same as or similar to applications 1210, illustrated and described in more detail with reference to FIGS. 12A and 12B. The validation layer 1206, agents 1308, and applications 1310 can be implemented using components of example devices 200 and client computing devices 302 illustrated and described in more detail with reference to FIG. 2 and FIG. 3, respectively. Implementations of example environment 1300 can include different and/or additional components or can be connected in different ways.

The proposed actions of the agents 1308 are evaluated by the evaluation layer 1304 (e.g., an NLP layer). The validation models 1302 are used by the evaluation layer 1304 to determine a degree of satisfaction of the proposed actions with the guidelines and identify gaps (i.e., in the case that the proposed actions fail to satisfy the guidelines). The validation models 1302 are specialized or generic AI models that perform the validation tasks within the validation layer 1206. The validation models 1302 can include machine learning algorithms, rule-based systems, and/or heuristic algorithms. In some implementations, the validation models 1302 can be domain-specific and/or generic. In some implementations, the validation models 1302 can be deployed in a distributed architecture using cloud-based services and/or parallel processing to distribute the validation workload across multiple servers. Executing the evaluation layer 1304 on the agents 1308 can include comparing the proposed actions against predefined rules, historical data, and/or learned patterns of the validation models 1302 to assess compliance. Methods of executing the evaluation layer 1304 are discussed further with reference to FIG. 15.

The modification layer 1306 (e.g., another NLP layer) uses the validation models 1302 to modify the proposed actions of the agents 1308 using the identified gaps. For example, the modification layer 1305 can perform action substitution (i.e., action removal, action addition), parameter adjustment, and/or action sequence reordering. Action substitution includes replacing a proposed action with an alternative that better adheres to guidelines. For example, if an agent proposes accessing sensitive data without proper authorization, the system can substitute the action with an action to request appropriate permissions first. Parameter adjustment can include modifying values of a proposed action such as transaction limits, data access levels, or timing of operations to bring the action(s) into compliance. Action sequence reordering enables the system to restructure the order of proposed actions by, for example, prioritizing certain actions (e.g., security checks or data validation steps) before executing other proposed actions.

The modified sequence of actions can be automatically executed by the respective agents 1308 on the particular application 1310. In some implementations, the agents 1308 automatically perform one or more user interactions 1312, such as directing the user to speak to a customer service representative. User interaction 1312 refers to the various ways in which the agents 1308 (e.g., the third agent 1308c) interact with users to perform tasks or provide information. For example, the agents 1308 can communicatively connect a user to another user (e.g., an administrator), communicatively connect a user to an application (e.g., a chatbot), prompt the user for additional information, and so forth. Methods of executing the modification layer 1306 are discussed further with reference to FIG. 15.

Using the NLP layers (e.g., evaluation layer 1304, modification layer 1306), the agents 1308 can autonomously execute tasks, request services from other agents 1308, and perform decision-making based on predefined rules and real-time data, reducing the need for human intervention. For example, agents 1308 can interact using natural language instead of or in addition to predefined communication protocols (e.g., XML/SOAP), enabling agents 1308 (e.g., the first agent 1308a and/or the second agent 1308b) to perform tasks such as ticket assignment, modification, and status updates across platforms like JIRA, SERVICENOW, or other enterprise systems. Agents 1308 (e.g., the first agent 1308a and/or the second agent 1308b) can execute business actions (e.g., getAccountDetails( ), transferFunds( ), requestLoan( )), execute actions/tasks based on customer needs (e.g., updateAddress( ), requestChequeBook( )), automate workflows such as task escalation, report generation, data entry, and so forth.

The validation models 1302 can further evaluate communication between agents 1308. The communication between agents 1308 includes text-based requests (e.g., "Assign ticket to John"), collaboration between agents 1308 (e.g., one agent requests another to complete a task), multi-agent workflows where tasks are broken down into smaller components and distributed, and/or multi-agent decision-making where more than one agent can take a collective decision (both using different LLM models) and come to a conclusion. In some implementations, text-based requests such as "Assign the highest priority ticket to John and notify him immediately" can be broken down into actionable components, such as identifying the highest priority ticket, assigning it to John, and sending a notification.

Additionally or alternatively, collaboration between agents 1308 can be facilitated through a shared knowledge base or a centralized task management system. To implement this, a database or a distributed ledger can be used to store information about ongoing tasks, agent capabilities, and resource availability. Agents 1308 can query the database to find available resources or to update the status of their tasks. For example, if an agent is overloaded, the agent can check the database for other agents 1308 with available capacity and request assistance. In some implementations, multi-agent workflows can be implemented using a hierarchical architecture, where a primary agent can be programmed to break down an overall tasks into smaller subtasks and assigns the smaller subtasks to specialized agents. Each agent can execute its subtask independently and report back to the primary agent. For example, a task to generate a financial report can be broken down into data collection, data analysis, and report generation, with each subtask assigned to different agents.

Figure 14:
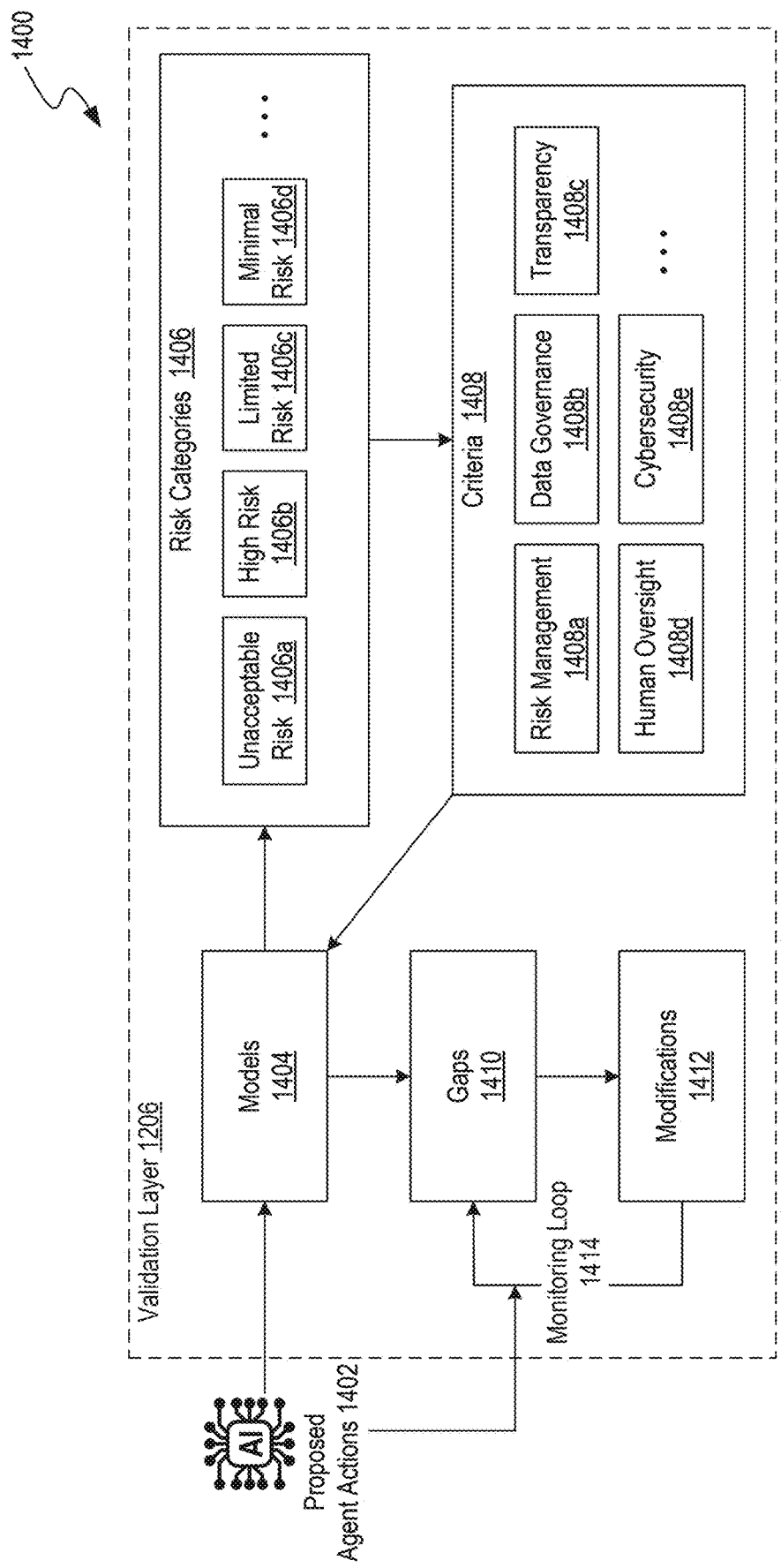
FIG. 14 is a block diagram illustrating an example environment for identifying gaps in proposed actions of the autonomous agent.

FIG. 14 is a block diagram illustrating an example environment 1400 for identifying gaps in proposed actions of the autonomous agent. The example environment 1400 includes proposed agent actions 1402 and validation layer 1206. The validation layer 1206 includes models 1404, risk categories 1406 (e.g., unacceptable risk 1406a, high risk 1406b, limited risk 1406c, minimal risk 1406d, and so forth), criteria 1408 (e.g., risk management 1408a, data governance 1408b, transparency 1408c, human oversight 1408d, cybersecurity 1408e, and so forth), gaps 1410 in the proposed agent actions 1402, modifications 1412 of the proposed agent actions 1402, and a monitoring loop 1414 between the gaps 1410 and the modifications 1412. Implementations of example environment 1400 can include different and/or additional components or can be connected in different ways.

When the agent generates proposed agent actions 1402, the proposed agent actions 1402 are evaluated by the validation layer 1206 using models 1404. Models 1404 are the same as or similar to validation models 1302 discussed with reference to FIG. 13 and are used to validate and potentially modify the proposed agent actions 1402. The models 1404 can assign the proposed agent actions 1402 into risk categories 1406 and assess the proposed agent actions 1402 against criteria 1408. Risk categories 1406 classify the proposed agent actions 1402 based on the level of risk the proposed agent actions 1402 pose. In some implementations, different classification schemas can be used to define risk categories. For example, risk categories can categorize risks by the potential impact, occurrence timeframe, associated software or hardware assets, operational disruption, and so forth of the proposed agent actions 1402. In some implementations, the classification schemas can be based on machine learning models trained on historical data to predict the risk level of proposed actions. The models can use parameters such as the frequency of similar actions, the context in which the actions are proposed, and the historical outcomes of such actions.

If gaps 1410 are identified, the modification layer 1306 adjusts the proposed actions 1402 to address the gaps 1410. Gaps 1410 in the proposed agent actions 1402 indicate areas where the proposed actions fail to meet criteria 1408. In some implementations, gaps 1410 can be categorized based on their severity and impact on one or more software or hardware assets. The modified actions can be re-evaluated using models 1404 to ensure that the modified actions meet the criteria 1408 using the monitoring loop 1414 prior to execution.

Figure 15:
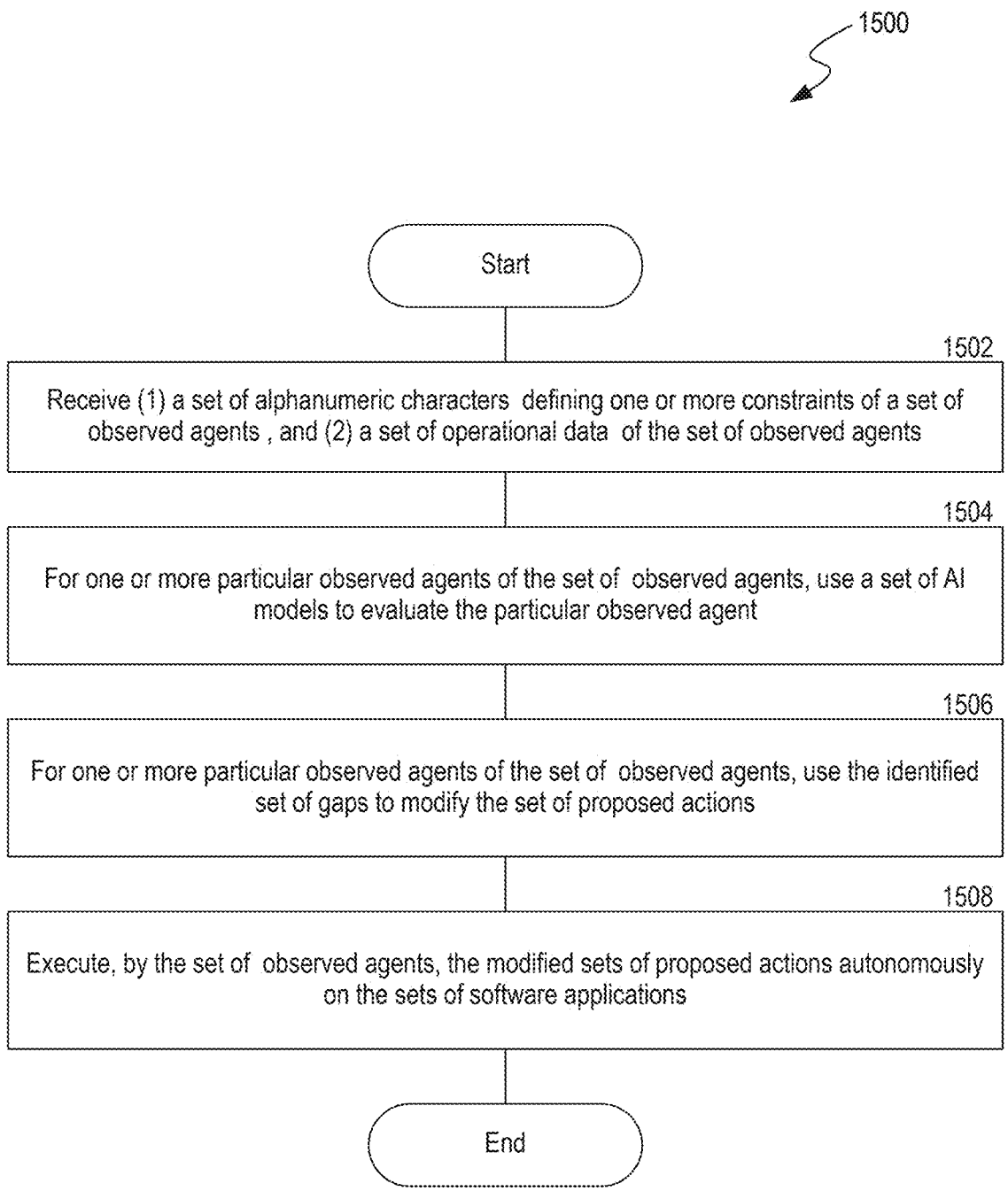
FIG. 15 is a flow diagram illustrating an example process of validating autonomous agents using an AI model.

FIG. 15 is a flow diagram illustrating an example process 1500 of validating autonomous agents using an AI model. In some implementations, the example process 1500 is performed by a system (e.g., validation layer 1206) including components of the example environment 600 illustrated and described in more detail with reference to FIG. 6. The system can be implemented on a terminal device, on a server, or on a telecommunications network core. Likewise, implementations can include different and/or additional operations or can perform the operations in different orders.

In operation 1502, the system obtains (e.g., receives) (1) a set of alphanumeric characters (e.g., guidelines 602, guidelines 802, guidelines 902, and so forth) defining one or more constraints of a set of agents (e.g., agent 1204, agents 1308, AI agents, non-AI agents, observed agents), and (2) a set of operational data of the set of agents. In some implementations, the alphanumeric characters defining constraints can include specific parameters such as operational limits, regulatory requirements, or performance thresholds. The system can alternatively or additionally receive the constraints and operational data in different forms (e.g., spoken utterances, links, digital documents, images, video, sensor data, real-time streaming data, or other forms of input).

The agents of the set of agents can be configured to, responsive to a prompt, use (1) an output of a first set of AI models of the agent, and (2) a set of predefined objectives of the agent to autonomously generate a set of proposed actions configured to be executed on a set of software applications. The set of operational data of the particular agent of the set of agents can include the prompt, the set of proposed actions generated by the particular agent, the output of the first set of AI models, the set of predefined objectives of the particular agent, and/or the set of software applications interacting with the particular agent. The agent can, for example, access file systems to read or write data, query databases to retrieve or update records, establish network connections to communicate with remote services or APIs, and so forth.

In some implementations, operational data includes specifics about the software applications, such as version numbers, configuration settings, API endpoints, and the nature of the interactions (e.g., read/write operations, data retrieval, or command execution). For instance, operational data can capture API request logs detailing the parameters sent, response times, and/or errors encountered during the interaction. Further, operational data can include hardware-related metrics from servers, network devices, and Internet of Things (IoT) sensors, such as CPU usage, memory consumption, disk input/output (I/O), network latency, and/or sensor readings. Additionally, operational data can include metadata such as the agent's risk category, performance metrics, historical success rates, and/or current compliance status. For example, an agent's risk category can be classified based on predefined criteria, such as high, medium, or low risk. Other metadata can include contextual factors of the user such as user role, previously proposed actions, previously executed actions, and so forth.

In operation 1504, for one or more particular agents of the set of agents, the system uses a second set of AI models to evaluate the particular agent. For example, the system uses the set of operational data of the particular agent to map (e.g., associate, link, relate) one or more particular agents to a risk category defined within a set of vector representations of the set of alphanumeric characters based on, for example, a level of risk associated with the set of proposed actions of the particular agent. The risk category can be mapped by a predefined mapping (e.g., within the agent's operational data), or dynamically determined by the second set of AI models. For example, the system can use a predefined mapping where specific actions or keywords directly correspond to risk categories. Alternatively, the second set of AI models can identify patterns and/or anomalies that indicate varying levels of risk. For instance, if an agent frequently accesses sensitive customer data, the AI models can classify the proposed actions as high risk. The models can use contextual factors such as the agent's historical behavior, the sensitivity of the data involved, the current security environment, and so forth.

To map the agent to the risk category, the system can map one or more proposed actions in the set of proposed actions to an action-specific risk category within a plurality of risk categories. The system can assign a confidence score to one or more proposed actions in accordance with the action-specific risk category, and aggregate the confidence scores to generate the risk category for the particular agent. The system can use, for example, historical actions executed by the agent, a monetary amount involved in a transaction associated with the agent, and/or a set of hardware system assets interacting with the set of software applications to map the agent to the risk category.

To determine confidence scores, the system can use machine learning models, such as decision trees or neural networks, to analyze historical data to predict the risk level of proposed actions. The confidence score is derived from the model's output probability, indicating the likelihood of the action belonging to a specific risk category. In a rule-based approach, predefined rules and thresholds can be applied to assess the risk of each action. For example, actions involving financial transactions exceeding a certain threshold or access to certain sensitive data can trigger high-risk categorizations. The confidence score can be calculated based on the number and severity of rules triggered. Additionally, clustering algorithms can group similar actions, with the confidence score reflecting the density and homogeneity of the clusters. More tightly grouped clusters can indicate higher confidence in the risk assessment.

The aggregation of confidence scores can be performed using various methods, such as weighted averaging, or by using a voting mechanism, where the most frequently occurring risk category among the proposed actions determines the agent's overall risk level. In some implementations, the system can use temporal factors, such as the timing and sequence of actions, to determine the risk category. For instance, a series of high-risk actions performed in quick succession can elevate the overall risk category for the agent compared to isolated high-risk actions spread over a longer period. In some implementations, the system can integrate various contexts into the evaluation, such as the user role (e.g., "bank manager"), the amount involved (e.g., "$10,000"), and any specific conditions (e.g., "subject to credit score verification"). For example, a proposed action may be categorized as "High Risk" for a certain user role, but "Low Risk" for a different user role.

Additionally or alternatively, the system can map one or more proposed actions in the set of proposed actions to an action-specific risk category depending on task sensitivity, action explainability, user feedback, LLM voting, and/or peer assessment. For example, the system can evaluate the sensitivity of the task associated with each proposed action using the context and content of the task (e.g., tasks that involve handling sensitive data, such as financial transactions or personal data processing, can be assigned higher risk categories). The system can further evaluate the explainability of the proposed action by determining how easily the action can be explained and understood by users (e.g., by examining the number of steps involved, the actions' interdependencies, and so forth). Actions that are transparent (e.g., lower interdependencies) and/or can be easily justified are assigned lower risk categories, while actions that are complex or lack clear rationale are assigned higher risk categories. The system can, in some implementations, incorporate user feedback, where positive feedback can lower the risk category, while negative feedback can increase the risk category. Additionally, the system can use multiple LLMs to evaluate the actions and vote on their risk levels. The system can aggregate the evaluations from different LLMs and determine the final risk category based on majority or weighted voting. Peer assessment (e.g., from humans, from other models) can be used to ensure that the actions are evaluated from multiple perspectives.

The system can use the set of alphanumeric characters to generate a set of expected actions of the particular agent by extracting a set of keywords from the set of alphanumeric characters associated with the mapped risk category using, for example, tokenization to break down the alphanumeric characters into individual words or phrases, part-of-speech tagging to label each word with its grammatical role, and/or named entity recognition (NER) to detect and classify entities such as names, dates, and specific terms. Additionally, the system can use clustering techniques to determine risk categories by grouping similar sets of alphanumeric characters based on their features. Clustering algorithms such as K-means or hierarchical clustering can be used to identify patterns and group the data into clusters that represent different risk levels. For instance, clusters with frequent occurrences of terms related to financial transactions or sensitive data access can be classified as high risk.

Using the prompt, the system can identify one or more API requests to one or more of the sets of software applications in accordance with the set of keywords. The system then searches through a registry of available APIs, which could include endpoints for databases, file systems, network services, or other enterprise applications, to find those that align with the extracted keywords. The system can use the prompt to filter and prioritize the API requests. For example, if the prompt involves retrieving customer data, the system might identify APIs related to customer databases and data retrieval operations. Further, the keywords can operate as constraints that the system uses when generating an expected actions to ensure that the actions are not only responsive to the prompt but also compliant with predefined guidelines (e.g., rules and regulations). For instance, if the keywords include terms related to data privacy, the system can prioritize or filter on API requests that include encryption and access control measures.

The system can identify a set of gaps of the set of proposed actions of the particular agent by comparing (1) the set of expected actions of the particular agent with (2) the set of proposed actions of the particular agent. The gaps can include missing actions, actions that are inconsistent with the agent's typical behavior patterns, non-compliant actions, and so forth. For instance, if the expected actions include regular data backups and the proposed actions omit this step, a gap is identified. Gaps can arise from timing discrepancies, where actions are performed out of sequence or at inappropriate times.

In some implementations, for low-risk transactions, such as those involving small dollar amounts or routine operations, the system can execute the transaction automatically. However, for high-risk transactions, such as those involving large sums of money or sensitive data, the system may require human approval. In some applications, such as loan processing, any changes may need approval regardless of the query. Conversely, in other applications, no approval may be needed regardless of the query.

In operation 1506, for one or more particular agents of the set of agents, the system can use a third set of AI models and the identified set of gaps to modify the set of proposed actions by performing at least one of: adding, altering, or removing one or more actions from the set of proposed actions. In some implementations, the proposed actions are modified to be the same as the expected actions. The system can use decision trees or ensemble methods, such as random forests, to evaluate multiple potential modifications and select a single set of actions. The decision trees recursively split the data into subsets based on the most significant features, creating a tree-like model of decisions. Each node in the tree represents a decision point, where the system evaluates a specific criterion, such as risk level or a particular compliance requirement, to determine the best course of action. The leaves of the tree represent the final decisions or modifications to the proposed actions. In a random forest, numerous decision trees are trained on different subsets of the data and features, and their outputs are aggregated to produce a final decision. In some implementations, the system can incorporate a human-in-the-loop, where human users review and approve the modifications suggested by the AI models. For example, users can review the proposed modifications, suggest further adjustments, and/or approve the final set of actions.

In some implementations, the system can use the set of expected actions and the third set of AI models to generate a recommended action (i.e., proposed modifications to the proposed actions) in accordance with the set of predefined objectives of the particular agent. The system can display, on a graphical user interface (GUI) of the computing device, a graphical layout of (1) a first representation indicating the set of expected actions, (2) a second representation indicating the recommended action, and/or (3) a third representation indicating one or more predefined objectives of the set of predefined objectives satisfied by the recommended action. In some implementations, the GUI can also include interactive elements that allow users to explore the details of each representation. For instance, users can click on an expected action to view the action's specific criteria and requirements, or hover over the recommended action to see a detailed explanation of why the action was generated and how the action addresses the requirements from the guidelines.

In some implementations, the system can generate on a similar GUI, a graphical layout of (1) a first representation indicating the set of agents, and (2) a second representation indicating a degree of compliance of the set of proposed actions with the set of expected actions. In some implementations, the graphical layout can include (1) a first representation indicating the generated set of proposed actions, (2) a second representation indicating the modified set of proposed actions, (3) a third representation indicating the set of gaps of the set of proposed actions, and/or (4) a fourth representation indicating the set of alphanumeric characters. For example, the system can include a dashboard interface enabling real-time monitoring, communication, and/or coordination among agents. The dashboard can enable visibility into agent activity, status, and task progress. The dashboard can display various metrics and visual indicators, such as real-time status updates, performance metrics, alerts for deviations or issues (e.g., based on predefined thresholds or conditions), and so forth. Users can interact with the dashboard to view specific agent activities, review logs, and/or communicate directly with agents to provide instructions or feedback.

In operation 1508, the set of agents can execute the modified sets of proposed actions autonomously on the sets of software applications. For example, the system can transmit one or more API requests to one or more of the sets of software applications. Using the prompt, the system can generate a sequence of API calls by chaining multiple API endpoints, wherein an output of a previous API call operates as an input for a subsequent API call to be executed subsequent to the previous API call. In some implementations, the system can execute scripts written in a language such as PYTHON to automate tasks across different applications. The scripts can be scheduled to run at specific intervals using cron jobs or triggered by specific events using task schedulers. In some implementations, the system can use serverless computing platforms such as AWS LAMBDA, where the system triggers functions in response to events, such as data changes or user actions.

In some implementations, the system can automatically trigger downstream applications to satisfy conditions needed to perform the proposed action. For instance, if a person requests withdrawing $5,000 but the bank only has $4,000 available, the system can automatically increase the credit line and ask the user for approval. The decision to trigger such actions can be made using a large language model (LLM). In some implementations, the system can use a rules-based engine to determine the necessary downstream actions. The rules-based engine can be configured with predefined rules and conditions that specify how to handle various scenarios. For example, the rules-based engine can include conditions such as "if withdrawal amount exceeds available balance, then check credit limit and increase if possible." Additionally or alternatively, the system can leverage machine learning models to predict corrective action(s) based on historical data and patterns. The models can analyze past transactions and user behaviors to determine the most likely response to remediate the gap. For instance, if the system detects that a user frequently requests withdrawals that exceed their available balance, the system can proactively increase their credit line or suggest alternative actions, such as transferring funds from another account.

In some implementations, the system detects a set of updates to the set of alphanumeric characters. Responsive to detecting the set of updates, the system can dynamically modify the set of expected actions in accordance with the set of updates. Once an update is detected, the system can trigger a callback function or event handler to update the set of expected actions based on the detected changes (i.e., recalculating or adjusting the actions to align with the new set of alphanumeric characters).

The system can include a global control mechanism (e.g., a kill switch) that enables the termination or suspension of single-agent operations or multi-agent operations associated with the set of agents (e.g., targeted agents). When the global control mechanism is activated, a server of the system can transmit a termination or suspension command to the targeted agents. Upon receiving the command, the targeted agents can execute predefined shutdown or suspension procedures, which can include terminating ongoing tasks, releasing resources, and/or logging the event for audit purposes. In some implementations, the global control mechanism can be integrated into the system's dashboard interface, allowing users to trigger the global control mechanism with a set of gestures (e.g., a click, a swipe, and so forth).

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A non-transitory computer-readable storage medium comprising instructions thereon, wherein the instructions, when executed by at least one data processor of a system, cause the system to:
   receive, from a computing device: (1) a set of alphanumeric characters defining one or more constraints of a set of artificial intelligence (AI) agents, and (2) a set of operational data of the set of AI agents,
      wherein each AI agent of the set of AI agents is trained to, responsive to a prompt, use (1) an output of a first set of large language models (LLMs) of the AI agent, and (2) a set of predefined objectives of the AI agent to autonomously generate a set of proposed actions, and
      wherein the set of operational data of each particular AI agent of the set of AI agents includes two or more of: the prompt, the set of proposed actions generated by the particular AI agent, the output of the first set of LLMs, the set of predefined objectives of the particular agent, or a corresponding set of software applications interacting with the particular agent;
   for each particular AI agent of the set of AI agents, use a second set of LLMs to evaluate the particular AI agent by:
      using the set of operational data of the particular AI agent, mapping each particular AI agent to a risk category defined within a set of vector representations of the set of alphanumeric characters;
      using the set of alphanumeric characters, generating a set of expected actions of the particular AI agent by:
         extracting a set of keywords from the set of alphanumeric characters associated with the mapped risk category, and
         using the prompt, identifying one or more application programming interface (API) requests to one or more of the sets of software applications in accordance with the set of keywords; and
      identifying a set of gaps of the set of proposed actions of the particular AI agent by comparing (1) the set of expected actions of the particular AI agent with (2) the set of proposed actions of the particular AI agent;
   displaying, at a graphical user interface (GUI), a graphical layout including a representation indicating the identified set of gaps;
   responsive to receiving a user input, for each particular AI agent of the set of AI agents, trigger execution of a set of corrective actions to modify the set of proposed actions by performing at least one of: adding, altering, or removing one or more actions from the set of proposed actions;
   for each particular AI agent of the set of AI agents, transmit a respective modified set of proposed actions of the particular AI agent into one or more nodes of an input layer of the second set of LLMs to validate an absence of the identified set of gaps within the modified set of proposed actions; and
   execute, by the set of AI agents, the modified sets of proposed actions autonomously on the sets of software applications.

2. The non-transitory computer-readable storage medium of claim 1, wherein the representation indicating the identified set of gaps is a first representation, and wherein
   the graphical layout further includes: (1) a first second representation indicating the set of AI agents, (2) a third representation indicating a degree of compliance of the set of proposed actions with the set of expected actions, and (3) a fourth representation of one or more of: a status of one or more of the set of AI agents or a task progress of one or more of the set of AI agents.

3. The non-transitory computer-readable storage medium of claim 1, wherein the execution of the modified sets of proposed actions includes transmitting one or more API requests to one or more of the sets of software applications.

4. The non-transitory, computer-readable storage medium of claim 1, wherein the instructions further cause the system to:
   detect a set of updates to the set of alphanumeric characters; and
   responsive to detecting the set of updates, dynamically modify the set of expected actions in accordance with the set of updates.

5. The non-transitory computer-readable storage medium of claim 1, wherein the instructions for mapping each particular AI agent to the risk category further cause the system to:
- map each proposed action in the set of proposed actions to an action-specific risk category within a plurality of risk categories;
- assign a confidence score to each proposed action in accordance with the action-specific risk category; and
- aggregate the confidence scores to generate the risk category for the particular agent.

6. The non-transitory computer-readable storage medium of claim 1, wherein the second set of LLMs is trained to select the mapped risk category in accordance with a level of risk associated with the set of proposed actions of the particular AI agent.

7. The non-transitory computer-readable storage medium of claim 1, wherein the instructions further cause the system to:
- using the set of expected actions and a third set of LLMs, generate a recommended action in accordance with the set of predefined objectives of the particular agent,
- wherein the representation indicating the identified set of gaps is a first representation, and wherein the graphical layout further includes:
- (1) a second representation indicating the set of expected actions, (2) a third representation indicating the recommended action, and (3) a fourth representation indicating one or more predefined objectives of the set of predefined objectives satisfied by the recommended action.

8. A computer-implemented method for validating agents using an artificial intelligence (AI) model, the method comprising:
- obtaining, from a computing device: (1) a set of alphanumeric characters defining one or more constraints of a set of agents, and (2) a set of operational data of the set of agents,
  - wherein each agent of the set of agents is trained to, responsive to a prompt, use (1) an output of a first set of AI models of the agent, and (2) a set of predefined objectives of the agent to autonomously generate a set of proposed actions;
- for each particular agent of the set of agents, using a second set of AI models to evaluate the particular agent by:
  - using the set of operational data of the particular agent, mapping each particular agent to a risk category defined within a set of vector representations of the set of alphanumeric characters;
  - using the set of alphanumeric characters, identifying a set of expected actions of the particular agent by:
    - extracting a set of keywords from the set of alphanumeric characters associated with the mapped risk category, and
    - using the prompt, identifying one or more application programming interface (API) requests to a corresponding set of software applications in accordance with the set of keywords; and
  - identifying a set of gaps of the set of proposed actions of the particular agent by comparing (1) the set of expected actions of the particular agent with (2) the set of proposed actions of the particular agent;
- transmitting, via the computing device, a representation indicating the identified set of gaps;
- responsive to receiving a user input, for each particular agent of the set of agents, trigger execution of a set of corrective actions to modify the set of proposed actions by performing at least one of: adding, altering, or removing one or more actions from the set of proposed actions; and
- for each particular AI agent of the set of AI agents, transmit a respective modified set of proposed actions of the particular AI agent into one or more nodes of an input layer of the second set of AI models to validate an absence of the identified set of gaps within the modified set of proposed actions; and
- executing, by the set of agents, the modified sets of proposed actions autonomously on the sets of software applications.

9. The method of claim 8, further comprising:
- displaying, on a user interface of the computing device, a layout of (1) a first representation indicating the generated set of proposed actions, (2) a second representation indicating the modified set of proposed actions, and (3) a third representation indicating the set of alphanumeric characters.

10. The method of claim 8, wherein identifying the set of expected actions further comprises:
- using the prompt, generating a sequence of API calls by chaining multiple API endpoints, wherein an output of a previous API call operates as an input for a subsequent API call to be executed subsequent to the previous API call.

11. The method of claim 8, wherein the risk category is mapped using one or more of:
- historical actions executed by the agent,
- a monetary amount involved in a transaction associated with the agent, or
- a set of hardware system assets interacting with the set of software applications.

12. The method of claim 8, further comprising:
- generating for display, on a graphical user interface, a graphical layout of (1) a first representation indicating the set of agents, and (2) a second representation indicating a degree of compliance of the set of proposed actions with the set of expected actions.

13. The method of claim 8, wherein the execution of the modified sets of proposed actions includes transmitting one or more API requests to one or more of the sets of software applications.

14. The method of claim 8, further comprising:
- detecting a set of updates to the set of alphanumeric characters; and
- responsive to detecting the set of updates, dynamically modifying the set of expected actions in accordance with the set of updates.

15. A system comprising:
- at least one hardware processor; and
- at least one non-transitory memory storing instructions, which, when executed by the at least one hardware processor, cause the system to:
  - obtain, from a computing device: (1) a set of alphanumeric characters defining one or more constraints of a set of agents, and (2) a set of operational data of the set of agents,
    - wherein each agent of the set of agents is trained to, responsive to a prompt, use (1) an output of a first set of AI models of the agent, and (2) a set of predefined objectives of the agent to autonomously generate a set of proposed actions;
  - for one or more particular agents of the set of agents, use a second set of AI models to evaluate the particular agent by identifying a set of gaps of the set of proposed actions of the particular agent by comparing (1) a set of expected actions of the particular agent with (2) the set of proposed actions of the particular agent;

transmitting, via the computing device, a representation indicating the identified set of gaps;

responsive to receiving a user input, for one or more particular agents of the set of agents, trigger execution of a set of corrective actions to modify the set of proposed actions by performing at least one of: adding, altering, or removing one or more actions from the set of proposed actions; and for one or more particular agents of the set of agents, transmit a respective modified set of proposed actions of the one or more particular agents into one or more nodes of an input layer of the second set of AI models to validate an absence of the identified set of gaps within the modified set of proposed actions.

16. The system of claim 15, wherein the system is further caused to use the set of alphanumeric characters to identify the set of expected actions of the particular agent associated with a risk category, and wherein, in response to one or more of: the risk category or the prompt satisfying a predefined threshold, the system is further caused to use the set of agents to automatically execute the set of proposed actions.

17. The system of claim 16, wherein the system is further caused to:

generate for display, on a graphical user interface (GUI), a graphical layout of (1) a first representation indicating the set of agents, and (2) a second representation indicating a degree of compliance of the set of proposed actions with the set of expected actions.

18. The system of claim 15, wherein the execution of the modified sets of proposed actions includes transmitting one or more application programming interface requests to one or more sets of software applications interacting with the one or more particular agents.

19. The system of claim 15, wherein the instructions further cause the system to:

map each proposed action in the set of proposed actions to an action-specific risk category within a plurality of risk categories;

assign a confidence score to each proposed action in accordance with the action-specific risk category; and aggregate the confidence scores to generate a risk category for the particular agent.

20. The system of claim 15, wherein the system is further caused to:

using the set of expected actions and a third set of AI models, generate a recommended action in accordance with the set of predefined objectives of the particular agent; and display, on a GUI of the computing device, a graphical layout of (1) a first representation indicating the set of expected actions, (2) a second representation indicating the recommended action, and (3) a third representation indicating one or more predefined objectives of the set of predefined objectives satisfied by the recommended action.

* * * * *